(12) United States Patent
Takai

(10) Patent No.: US 6,571,097 B1
(45) Date of Patent: May 27, 2003

(54) ADAPTIVE ANTENNA DIRECTIVITY CONTROL METHOD AND SYSTEM THEREFOR

(75) Inventor: Kenichi Takai, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/506,694

(22) Filed: Feb. 18, 2000

(30) Foreign Application Priority Data

Feb. 22, 1999 (JP) .......................................... 11-043189

(51) Int. Cl.[7] ................................................. H04Q 7/20
(52) U.S. Cl. ..................... 455/436; 455/442; 455/444; 455/277.1; 455/277.2; 455/437; 370/332; 370/331
(58) Field of Search ................................. 455/442, 444, 455/562, 277.1, 277.2, 436, 437, 440; 370/331, 332

(56) References Cited

U.S. PATENT DOCUMENTS

| | | | | |
|---|---|---|---|---|
| 5,164,958 A | * | 11/1992 | Omura ........................... | 375/1 |
| 5,432,843 A | * | 7/1995 | Bonta ........................... | 379/60 |
| 5,483,668 A | | 1/1996 | Malkamaki et al. ........ | 455/33.2 |
| 5,485,631 A | * | 1/1996 | Bruckert ...................... | 455/33.3 |
| 5,893,033 A | * | 4/1999 | Keskitalo et al. ............ | 455/437 |
| 5,917,811 A | * | 6/1999 | Weaver, Jr. et al. ......... | 370/332 |
| 5,926,470 A | * | 7/1999 | Tiedemann, Jr. ............ | 370/334 |
| 6,088,590 A | * | 7/2000 | Anderson et al. ........... | 455/437 |
| 6,094,427 A | * | 7/2000 | Yi ................................ | 370/331 |
| 6,415,149 B1 | * | 7/2002 | Beavan et al. ............... | 455/442 |

FOREIGN PATENT DOCUMENTS

| | | |
|---|---|---|
| DE | 195 18 399 A1 | 11/1996 |
| DE | 195 24 927 A1 | 1/1997 |
| DE | 195 43 321 A1 | 5/1997 |
| JP | 96/00484 | 1/1996 |
| JP | 717667 | 4/1997 |
| JP | 10-70502 | 3/1998 |
| WO | WO 93/12590 | 6/1993 |

* cited by examiner

Primary Examiner—William Trost
Assistant Examiner—Thang Le
(74) Attorney, Agent, or Firm—Sughrue Mion, PLLC

(57) ABSTRACT

An adaptive antenna directivity control method and a system therefor is capable of reducing interference in an up-link and/or a down-link upon initiation of handoff to improve communication quality upon initiation of handoff to speed-up directivity control resulting in increasing of channel capacity. In the adaptive antenna directivity control method, a mobile station and base station to be connected with the mobile station in radio through an up-link and a down-link are governed by a supervisory station. Respective transmission signal or reception signal of a plurality of antenna elements of the base station are varied in amplitude and phase for combining in a particular orientation for establishing a directivity by a radiation pattern by combining. The method includes step of initiating soft handoff in the mobile station, step of obtaining an installation position information from a first base station which is connected before handoff and directivity information of an up-link of the first base station relative to the mobile station, step of predicting an orientation of the mobile station from own station by a second base station to be connected by handoff on the basis of the directivity information of the up-link, and step of determining an initial directivity control parameter of the up-link corresponding to obtained orientation of the mobile station.

14 Claims, 18 Drawing Sheets

ADAPTIVE ANTENNA DIRECTIVITY CONTROL METHOD AND SYSTEM THEREFOR

BACKGROUND OF THE INVENTION

1. Field of the Invention

The present invention relates generally to an adaptive antenna directivity control method and a system therefore in a mobile communication system applied a code division multiple access (CDMA) system or so forth. More particularly, the invention relates to an adaptive antenna directivity control method and a system therefore, in which amplitudes and a phases of transmission signals and reception signals of respective of a plurality of antenna elements are varied to form a combined radiation pattern for a particular orientation and to cancel output signals for other orientation, for forming a directivity.

2. Description of the Related Art

Conventionally, in radio communication, when a plurality of communication terminals perform communication simultaneously particularly at the same or close frequencies, communication jamming due to mutual interference, such as intermodulation or so forth, can be caused frequently. Therefore, multiplexed communication system permitting multiple simultaneous communication, such as known CDMA system, A frequency division multiple access (FDMA) and a time division multiple access (TDMA) have be employed. Even in such radio communication, it is still possible to cause mutual interference by a large number of communications in a limited frequency band and whereby to limit use efficiency of the frequency. On the other hand, it is also possible to cause interference due to adverse affect of a multiplexed wave propagation path (multipath) in metropolitan where many reflecting bodies, such as buildings, are present.

The CDMA system distinguishes each communication terminal from others by assigning an orthogonal code which has high auto-correlation and low cross-correlatioin. Thus, all of the terminals are performing communication using the same frequency. Particularly, in a mobile communication system, such as in a digital cellular mobile telephone system, propagation characteristics can be varied abruptly according to movement of the mobile terminal. In such wave propagating condition, orthogonality of the code can be broken to possibly cause degradation of communication quality due to mutual interference of communication. Therefore, in the CDMA system, a transmission power control for maintaining interference at respective terminals uniform, RAKE reception for effectively use a plurality of multipath waves having different delay periods, path capture and so forth according to IS-95 standard or so on, are performed.

In such mobile communication system according to the CDMA system, employment of an adaptive antenna has been attracting attention for the purpose of improvement of communication quality and improvement of use efficiency of the frequency. The adaptive antenna is constructed by regularly arraying a plurality of antenna elements for forming a special filter by appropriate weighting of amplitude and phase components for reception signals of different amplitudes and phases through respective antenna elements, in reception. In transmission, similarly to reception, by appropriate weighting of amplitude and phase components, arbitrary directivity characteristics (beam pattern and occasionally simply referred to as directivity) is established in antenna radiation.

As a result, in the mobile communication system, to which the CDMA system is applied, by use of the adaptive antenna, communication of a plurality of mobile terminals at the same frequency can be spatially separated to reduce mutual interference. Thus, use efficiency of the frequency can be improved.

In case of the cellular mobile communication system applied the CDMA system, associating with movement of the mobile terminal (occasionally referred to as mobile station), switching between cell base stations (occasionally referred to as base station) to establish radio channel connection is performed. Namely, so-called handoff is performed. In the cellular mobile communication system performing handoff, in particular the cellular mobile communication system according to the CDMA system, all base stations and mobile stations performs communication by spread spectrum using the same frequencies in respective of up-link and down-link. Thus, the mobile station can simultaneously communicate with both of the base station connected before handoff and the base station to be newly connected by handoff before the mobile station switches the base station. Namely, soft handoff can be performed.

In the mobile communication system employing the adaptive antenna which performs directivity control set forth above, in handoff of the CDMA system, directivity to the base station connected between handoff can be established stably and satisfactorily follow to the movement of the mobile station, however, sharp directivity (the beam pattern having small half value angle) to the base station to be connected cannot be established initially since orientation (direction/angle) of the mobile station cannot be determined. Accordingly, all orientation is retrieved at once to gradually predict the orientation of the mobile station to finally establish sharp directivity for the mobile station.

FIG. 15 is an illustration for explaining initial directivity control in the up-link in the base station to be connected by handoff to the mobile station when the conventional adaptive antenna is used.

In FIG. 15, the mobile station 3 is initially located in a cell area 5 (service area) where only transmission wave of the base station 1 reaches, and thus establishes radio channel connection with only base station 1. Thereafter, the mobile station 3 moves toward the base station 2 to be located near a cell area 6 (service area) of the base station 2. Then, soft handoff is initiated.

FIG. 15 shows directivities of respective up-links of the base station 1 and the base station 2 immediately after initiation of soft handoff in the mobile station 3. The up-link of the base station 1 as the base station connected before handoff appropriately follows to moving position of the mobile station and thus establishes sharp directivity (beam pattern 7).

In contrast to this, the up-link of the base station 2 establishes initial directivity (area 9) for retrieving all of orientations or only particular orientation (sector) since the position of the mobile station cannot be determined. Accordingly, the directivity (area 9) of the up-link of the base station 2 is the same area as the cell area 6 of the base station 2.

Broad (beam pattern having wide −3 dB gain position) of the directivity (area 9) of the up-link of the base station 2 should increase possibility of mutual interference to receive a transmission wave of the up-link from another mobile station 4 located at the position of the orientation where the mobile station is not present. Furthermore, as set forth above, from the condition of omnidirectional retrieval, adaptive antenna directivity control has been initiated to take a significant period for restoring the normal state of control.

FIG. 16 is a sequence chart between a supervisory station, the base station and the mobile station in the case where the conventional adaptive antenna directivity control set forth above.

FIG. 16 shows a sequence including a supervisory station upon initiating soft handoff of the mobile station 3 from the base station 1 to the base station 2. The mobile station regularly notifies a received pilot channel strength. The notice from the mobile station is notified to the supervisory station via the base station 1. In the supervisory station, judgment is made whether the mobile station 3 can handoff with the base station other than the base station 1 on the basis of the content of notice. ("H" in FIG. 16).

Here, if there is no base station to be an object of handoff, no event occurs. On the other hand, if there is the base station to handoff (base station 2 in FIG. 15) ("I" in FIG. 16), the supervisory station commands for the base station 2 to assign communication channel for the mobile station 3 ("J" in FIG. 16). According to the command from the supervisory station, the base station 2 assigns the communication channel, and in conjunction therewith, sends a response indicative of completion of channel assignment to the supervisory station ("K" in FIG. 16).

Normally, at this stage, the base station 2 starts transmission through a communication channel of the down-link, and is enabled to receive communication through the up-link from the mobile station 3. However, as set forth above, at this stage, the directivity of the up-link is established for the predetermined wide area. On the other hand, the supervisory station receiving the response from the base station 2 recognized completion of preparation of communication between the base station 2 and the mobile station 3 to command initiation of soft handoff between the mobile station 3 and the base station 2 ("L" in FIG. 16).

The mobile station 3 receiving the command initiates reception of communication through the down-link from the base station 2. At the same time, completion of handoff is notified to the supervisory station via the base station. Here, at the stage of "K" in FIG. 16, since the base station 2 starts control from the state of the initial wide directivity and performs tracing of the mobile station 3, it takes a period longer than a period between "E" to "F" in FIG. 5 which will be discussed later to restore the normal state control ("M" in FIG. 16). In other words, during this period, the base station receives communication from the mobile station 3 through the up-link and continues reception of the transmission wave from all orientation to cause mutual interference.

Similarly, even in the down-link, the base station connected before handoff can satisfactorily follow the mobile station with sufficiently stable directivity, whereas the base station to be connected by handoff has to perform transmission to entire sector area which is preliminarily determined upon installation of the base station.

FIG. 17 is an illustration for explaining an initial directivity control in the down-link of the base station to be connected by handoff when the conventional adaptive antenna directivity control set forth above is used.

FIG. 17 shows an example in which the pilot channel and the communication channel are to be controlled at mutually different directivities. On the other hand, movement of the mobile station 3 and the position thereof are the same as those shown in FIG. 15. An area 10 represents a directivity of a pilot channel in a certain sector (sector for the mobile station 3) in the base station 1. On the other hand, an area 11 represents a directivity of a pilot channel in a certain sector (sector for the mobile station 3). A beam pattern 12 represents a directivity of the down-link established by the base station 1 for the mobile station 3. On the other hand, a beam pattern 14 represents an initial directivity of the down-link established by the base station 2 for the mobile station 3.

The directivity of the down-link of the base station 1 which is connected before handoff, is established to satisfactorily follow the mobile station similarly to the case of the up-link, and is sharply established. In contrast to this, the directivity of the down-link of the base station 2 to be connected by handoff is to perform transmission through the down-link for omnidirection (cell area 6) since the orientation of the mobile station 3 is not known, or, in the alternative, to perform transmission to only particular sector area 1 by identifying the sector on the basis of information of the pilot channel of the base station 2, to which the mobile station establishes radio channel connection by the supervisory station and in accordance with the command of the supervisory station.

Therefore, when the base station 2 performs transmission through the down-link for the cell area 6, mutual interference can be caused in all of the mobile station other than the mobile station 3 located in the cell. On the other hand, when the base station 2 performs transmission through the down-link to the sector area 14, all of the mobile station other than the mobile station 3 located within the sector may cause mutual interference. Furthermore, similar to the case of the up-link, long period is required for restoring the normal state of control. It should be noted that the sequence of FIG. 16 is applicable for the down-link as is, discussion will be omitted. On the other hand, while discussion has been given for the case where the directivities of the pilot channel and the down-link are different, it is possible to control the directivities at the same directivity in certain system.

FIG. 18 is an illustration for explaining initial directivity control in the down-link of the base station to be connected by handoff to the mobile station in the case where the conventional adaptive antenna directivity control is used.

In FIG. 18, the directivities of the pilot channel and the communication channel are controlled to the same directivity. The beam pattern 15 represents the directivity of the pilot channel and the down-link of certain sector (sector for the mobile station 3) which is formed by the base station 1 for the mobile station 3. The beam pattern 17 represents the directivity of the pilot channel and the down-link of certain sector (sector for the mobile station 3) which is formed by the base station 2 for the mobile station 3.

It should be noted that a difference to FIG. 17 set forth above is only that the directivities of the pilot channel and the down-link of respective base stations 1 and 2 are the same, and others are basically the same. Accordingly, even in FIG. 18, the problem discussed in connection with FIG. 17 is encountered.

As set forth above, in the prior art, at every occasion of initiation of soft handoff in any mobile station, interference in the base station to be connected by handoff can be caused both in up-link and down-link. Furthermore, this problem is becoming more significant for substantial increase of occurrence of soft handoff since the recent mobile communication system, such as the cellular mobile telephone system has a tendency to narrow the cell area (service area) per the base station (formation of microcell), and in other words, channel capacity is reduced.

As prior art of handoff in this kind, there is Japanese Unexamined Patent Publication No. Heisei 10-70502, for "Directivity Controlled Antenna Device". In this prior art, the antenna is controlled adaptively with predicting orientation of the mobile station for permitting efficient use of the frequency and transmission power.

On the other hand, Japanese Unexamined Patent Publication (PCT) No. Heisei 9-510595, for "Phased Array Cellular Base Station with Improved Power Efficiency and Method Associated Thereto", facilitates use of an active phased array antenna by increasing power efficiency, reducing size of the cell area and by reducing radiation of spurious signal causing intermodulation in the base station.

In such prior art, the cell area of the base station tends to be reduced and frequency of occurrence of soft handoff is becoming higher. Therefore, interference in the base station to be connected by handoff tends to be caused frequently in both of the up-link and the down-link at every occurrence of initiation of soft handoff in any of the relevant mobile stations to lower communication quality at initiation of handoff. In such case, a problem of reduction of channel capacity can also be encountered. Therefore, even in the prior art disclosed in the above-identified publications, there has been still left a room for improvement.

SUMMARY OF THE INVENTION

The present invention has been worked out in view of the drawbacks in the prior art set forth above. It is an object of the present invention to provide an adaptive antenna directivity control method and a system therefore, which can reduce interference upon initiation of handoff in an up-link and/or a down-link to improve communication quality upon initiation of handoff, and can permit quick restoration of normal state of directivity control to result in increasing of channel capacity.

According to the first aspect of the present invention, an adaptive antenna directivity control method where a mobile station and base station to be connected with the mobile station in radio through an up-link and a down-link being governed by a supervisory station, respective transmission signal or reception signal of a plurality of antenna elements of the base station being varied in amplitude and phase for combining in a particular orientation for establishing a directivity by a radiation pattern by combining, comprises:

step of initiating soft handoff in the mobile station;

step of obtaining an installation position information from a first base station which is connected before handoff and directivity information of an up-link of the first base station relative to the mobile station;

step of predicting an orientation of the mobile station from own station by a second base station to be connected by handoff on the basis of the directivity information of the up-link; and step of determining an initial directivity control parameter of the up-link corresponding to obtained orientation of the mobile station.

The directivity of the up-link to be initially set by the second base station may be controlled by determining a directivity control parameter so that the directivity of the up-link is narrower than a normal cell or sector area.

A directivity information of a down-link of the first base station may be used in place of the directivity information of the up-link of the first base station for predicting orientation of the mobile station by the second base station for determining initial directivity control parameter for the down-link.

The second base station may determine directivity control parameter of individual pilot channel for the mobile station together with the initial directivity control parameter of the down-link.

The directivity control parameter may be determined so that the directivity of the down-link which is used when the second base station transmits signal initially is narrower than normal sector area.

The initial directivity control parameter may be determined in the first base station upon initiation of soft handoff in the mobile station, by notifying the installation position information of the first base station and the directivity control parameter to the second base station through the supervisory station.

A position information of the mobile station relative to the first station may be notified to the second base station via the supervisory station in place of the installation position information of the first base station for determining the initial directivity control parameter in the second base station.

The installation position information of the first base station may be preliminarily notified to peripheral base stations from the supervisory station in replace of notifying to the second base station.

The orientation of the mobile station may be approximately derived in the second base station.

According to the second aspect of the present invention, an adaptive antenna directivity control system where a mobile station and base station to be connected with the mobile station in radio through an up-link and a down-link being governed by a supervisory station, respective transmission signal or reception signal of a plurality of antenna elements of the base station being varied in amplitude and phase for combining in a particular orientation for establishing a directivity by a radiation pattern by combining, comprises:

the mobile station including means for initiating soft handoff;

a second base station to be connected by handoff including means for predicting an orientation of the mobile station from own station on the basis of installation position information from a first base station connected before handoff and a directivity information of the up-link of the first base station, and determining an initial directivity control parameter of the up-link and/or a down-link.

The base station may comprise a wired circuit interface portion at least processing interface with a supervisory station, a radio receiving portion, a radio transmitting portion and a base station control and storage portion, and a directivity control parameter in the down-link in the radio receiving portion and/or the down-link in the radio transmitting portion is determined by control process of the base station control and storage portion.

The base station control and storage portion may be provided in or out of the radio receiving portion and/or the radio transmitting portion.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

Figure 1:
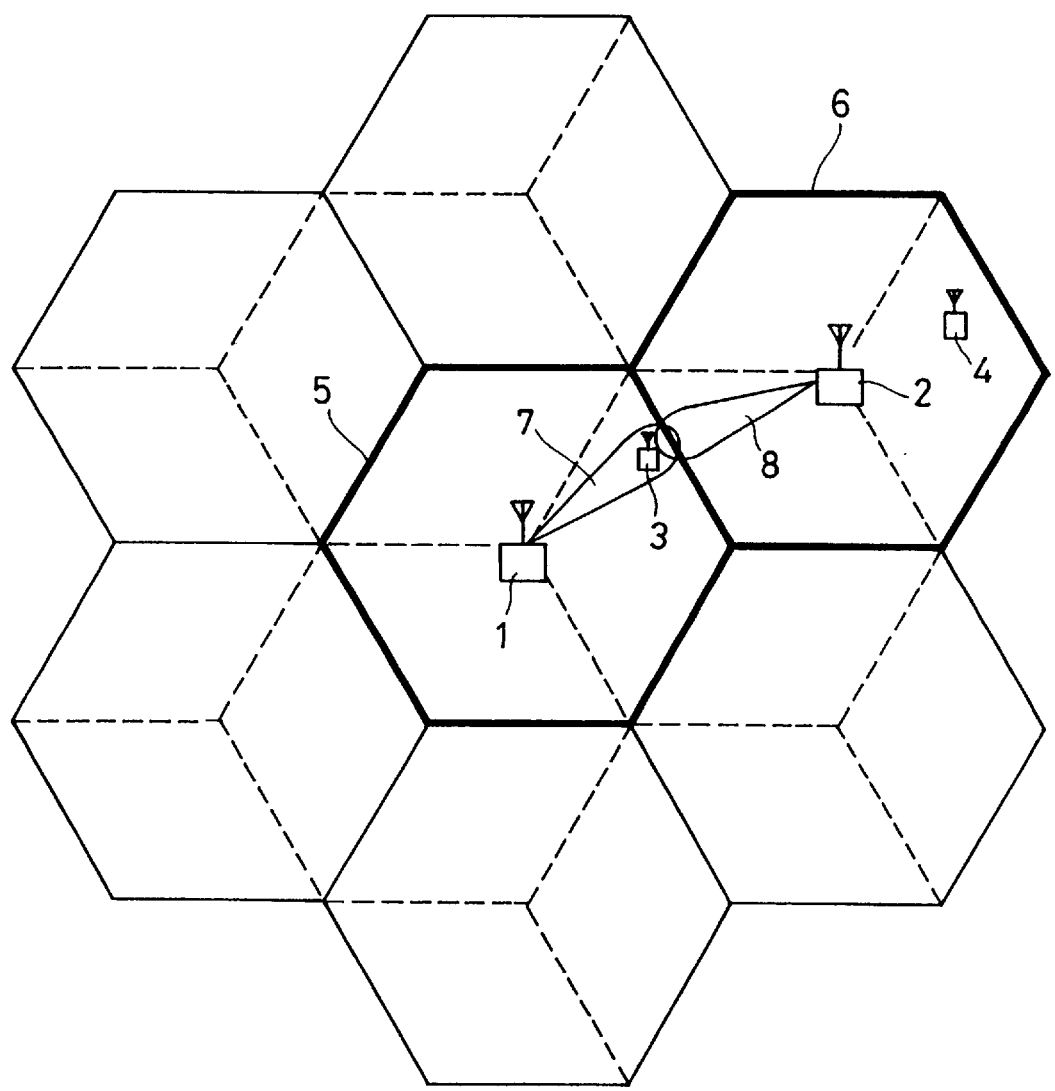
FIG. 1 is an illustration showing an overall construction in the first embodiment of an adaptive antenna directivity control method and a system therefore, in accordance with the present invention.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

The preferred embodiments of an adaptive antenna directivity control method and a system therefor according to the present invention will be discussed hereinafter in detail with reference to the accompanying drawings.

It should be noted that like elements to those shown in FIGS. 15 to 18 will be identified by like reference numerals and discussion therefor will be omitted in order to avoid redundant discussion to keep the disclosure simple enough to facilitate clear understanding of the present invention.

FIG. 1 is an illustration showing an overall construction in the first embodiment of an adaptive antenna directivity control method and a system therefor according to the present invention.

FIG. 1 shows cell areas around base stations 1 and 2 and cell areas thereof associated with soft handoff with a mobile station 3. A cell area 5 is a service area of the base station 1 and a cell area 6 is a service area of the base station 2. A beam pattern 7 represents an effective area of reception directivity established by the base station 1 which receives communication from the mobile station 3 in an up-link. Similarly, a beam pattern 8 represents an effective area of reception directivity established by the base station 2 which receives communication from the mobile station 3 in an up-link.

On the other hand, in FIG. 1, the mobile station 3 is in motion in an orientation from the base station 1 to the base station 2. FIG. 1 shows a condition immediately after initiation of soft handoff between the base station 1 and the base station 2.

Figure 2:
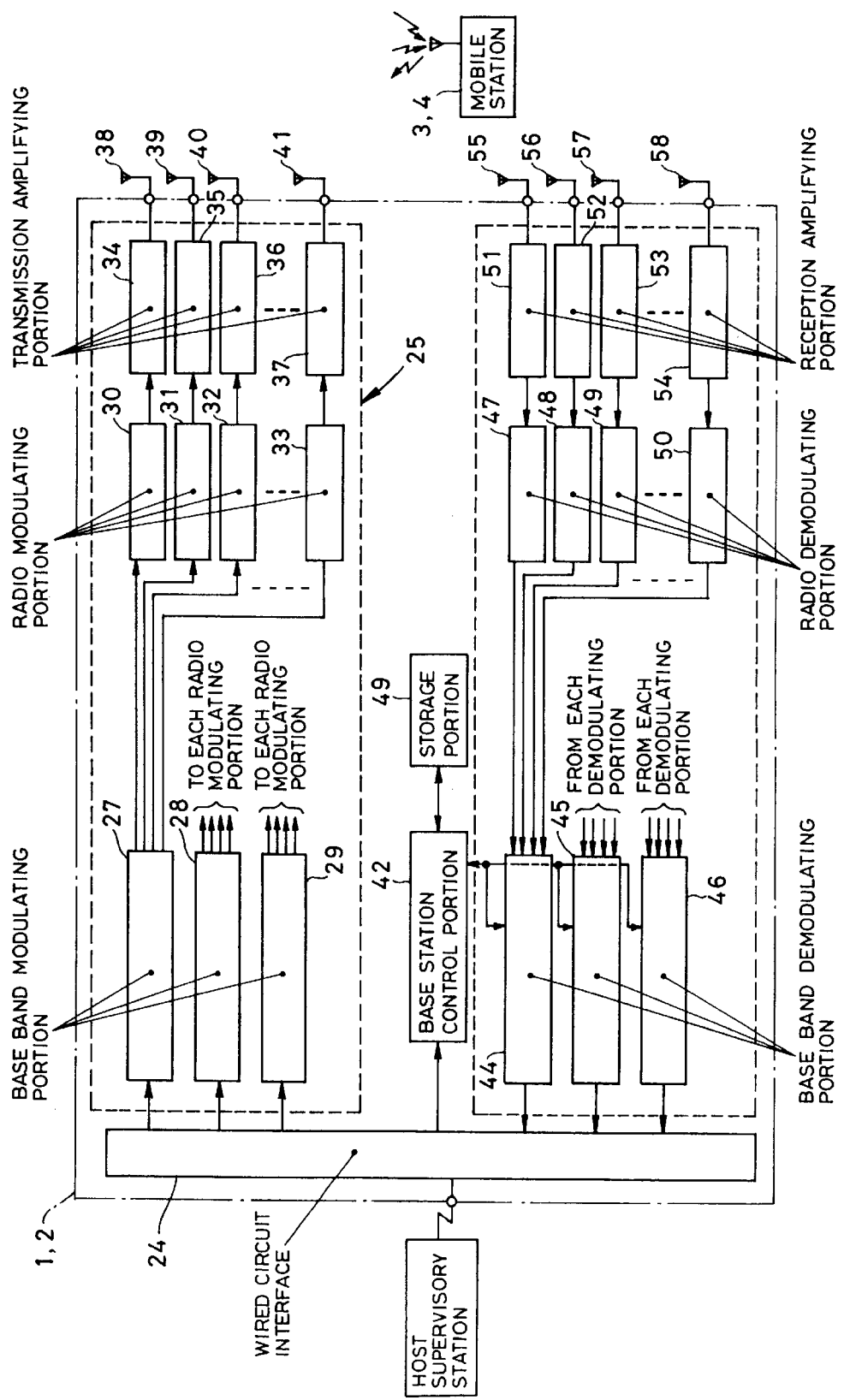
FIG. 2 is a block diagram showing an internal construction of a base station in FIG. 1.

FIG. 2 is a block diagram showing an internal construction of the base stations 1 and 2.

In each of the base stations 1 and 2, a transmitting portion 25 and a receiving portion 26 for performing communication with mobile stations 3 and 4, are connected to an interface portion 24 of a wired circuit connected to a supervisory station HOST shown in FIG. 1. The transmitting portion 25 has base band modulating portions 27, 28 and 29, radio modulating portions 30, 31, 32 . . . 33, transmission amplifying portions 34, 35, 36 . . . 37, and antennas 38, 39, 40 . . . 41. Also, in each of the base stations 1 and 2, a base station control portion 42 and a storage portion 49 are provided.

The receiving portion 26 has base band demodulating portions 44, 45, 46, radio demodulating portions 47, 48, 49 . . . 50, reception amplifying portions 51, 52, 53 . . . 54, and antennas 55, 56, 57 . . . 58.

Figure 3:
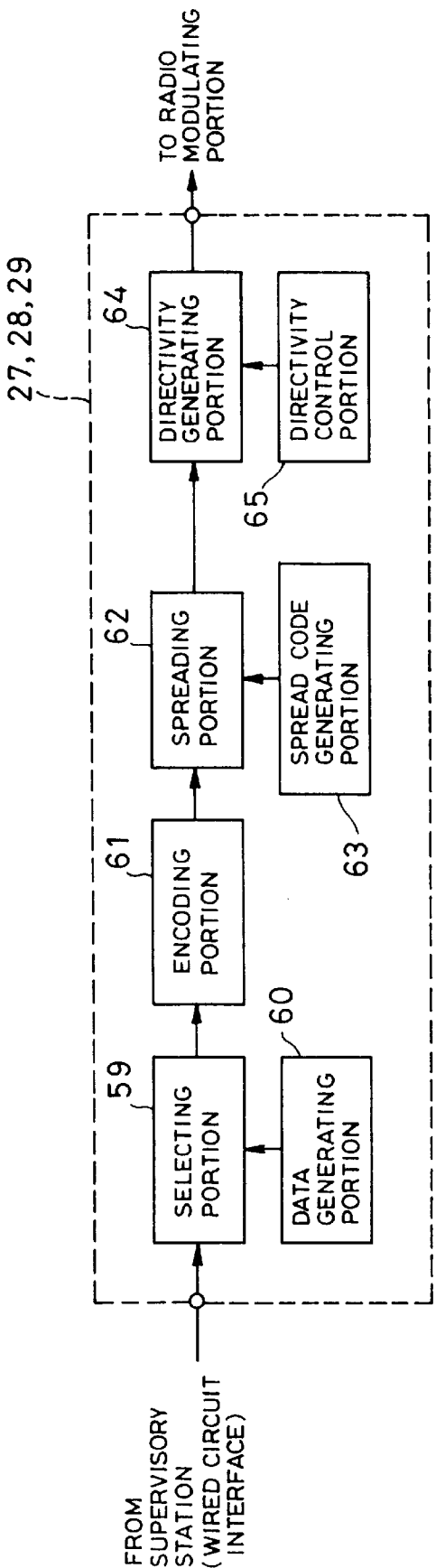
FIG. 3 is a block diagram showing an internal construction of a base band modulating portion in a transmitting portion shown in FIG. 1.

FIG. 3 is a block diagram showing an internal construction of each of the base band modulating portions 27, 28 and 29 shown in FIG. 2.

Each base band modulating portion 27 to 29 has a selecting portion 59, a data generating portion 60, an encoding portion 61, a spreading portion 62, a spread code generating portion 63, a directivity generating portion 64 and a directivity control portion 65.

Figure 4:
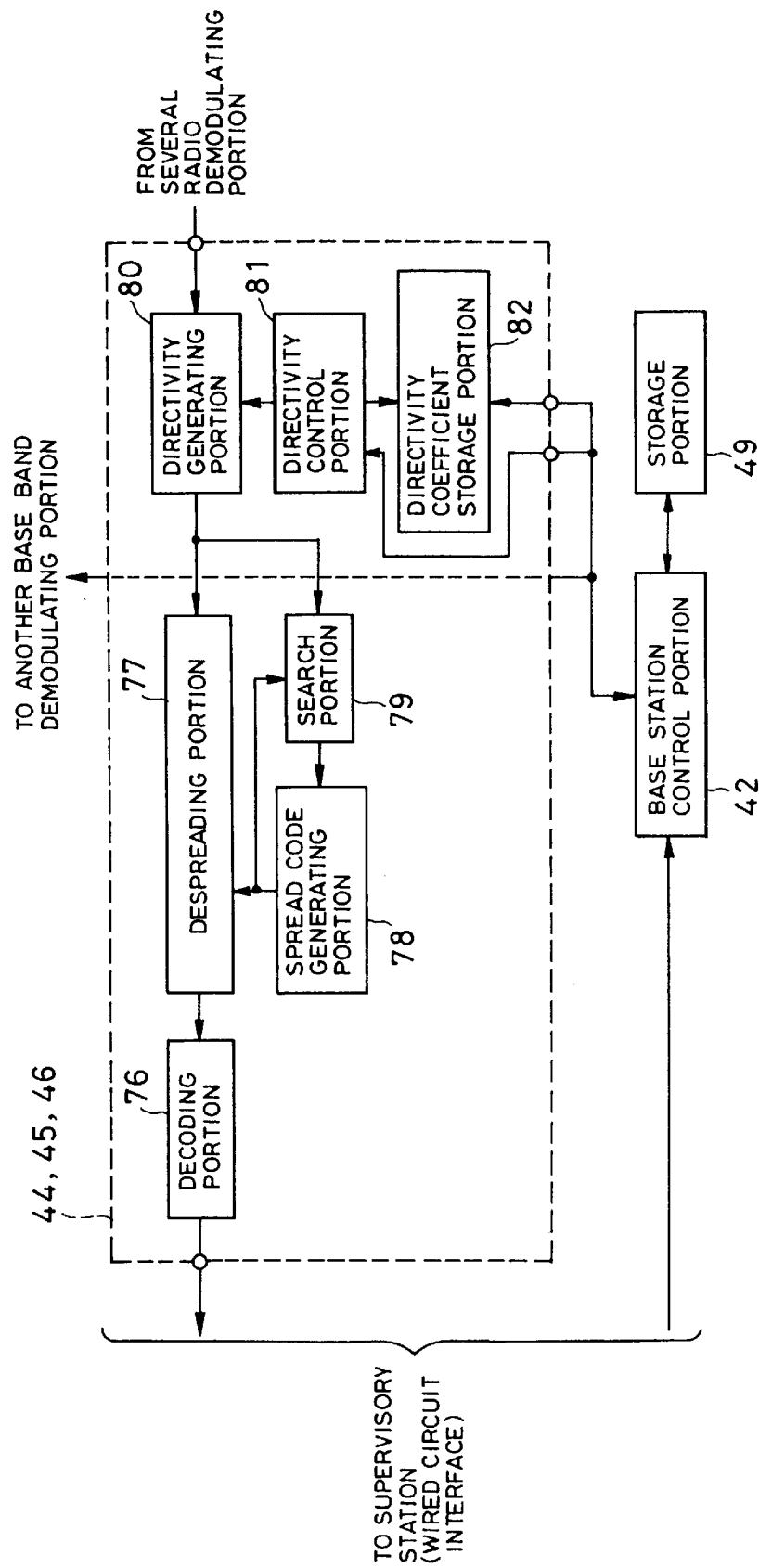
FIG. 4 is a block diagram showing an internal construction of a base band demodulating portion in a receiving portion shown in FIG. 2.

FIG. 4 is a block diagram showing an internal construction of each base band demodulating portion 44 to 46 in the receiving portion 26 shown in FIG. 2.

Each base band demodulating portion 44 to 46 has a decoding portion 76, a despreading portion 77, a spread code generating portion 78, a search portion 79, a directivity generating portion 80, a directivity control portion 81 and a directivity coefficient control portion 82.

Next, discussion will be given for operation of the first embodiment of the adaptive antenna directivity control method and the system therefor according to the present invention.

In FIGS. 1 and 2, data (for example, voice data, control data and so forth in a cellular mobile telephone system) from the wired circuit interface portion 24 connected to the supervisory station HOST is subject to a primary modulation in the base band modulating portions 27 to 29, and is further subject to spread code modulation (secondary modulation) by the radio modulation portions 30 . . . 33. Next, the spread code modulation signal is power amplified by the transmission amplifying portions 34 . . . 37 and is transmitted to the mobile stations 3 and 4 through the antennas 38 . . . 41 in down-link.

The receiving portion 26 receives transmission wave from the mobile stations 3 and 4 by reception amplifying portions 51 . . . 54 through antennas 55 . . . 58. For the reception signal, the radio demodulating portions 47 to 50 performs process for correlation (despreading) with a spread signal of a desired channel for extracting an objective primary modulation signal. Furthermore, the base band demodulating portions 44 to 46 performs demodulation to transmit control data and communication (transmission) data from the mobile stations 3 and 4 to the supervisory station HOST through the wired circuit interface portion 24.

On the other hand, the base station control portion 42 executes a reception directivity control for the up-link on the basis of position information of own station stored in the storage portion 49, an installation position information of the base station from the supervisory station HOST and a directivity information of the communication channel.

The base band modulating portions 27 to 29 of the transmitting portion 25 shown in FIG. 3 performs selection for the communication data from the supervisory station HOST (wired circuit interface portion 24) by the selecting portion 59 and the data generating portion 60 and further performs encoding by the encoding portion 61. Then, spreading is performed by the spreading portion 62 and the spread code generating portion 63. On the other hand, control for directivity is performed by the directivity generating portion 64 and the directivity control portion 65.

The base band demodulating portions 44 to 46 of the receiving portion 26 shown in FIG. 4 generates directivity for the demodulation signal from the radio demodulating portions 47 . . . 50 by the directivity control portion 80, the directivity control portion 81 and the directivity coefficient control portion 82 under control by the base station control portion 42. Furthermore, despreading is performed by the despreading portion 77, the spread code generating portion 78 and the search portion 79. Subsequently, the decoded data (communication data from the mobile stations 3, 4) from the decoding portion 76 is transmitted to the supervisory station HOST (wired circuit interface portion 24).

Figure 5:
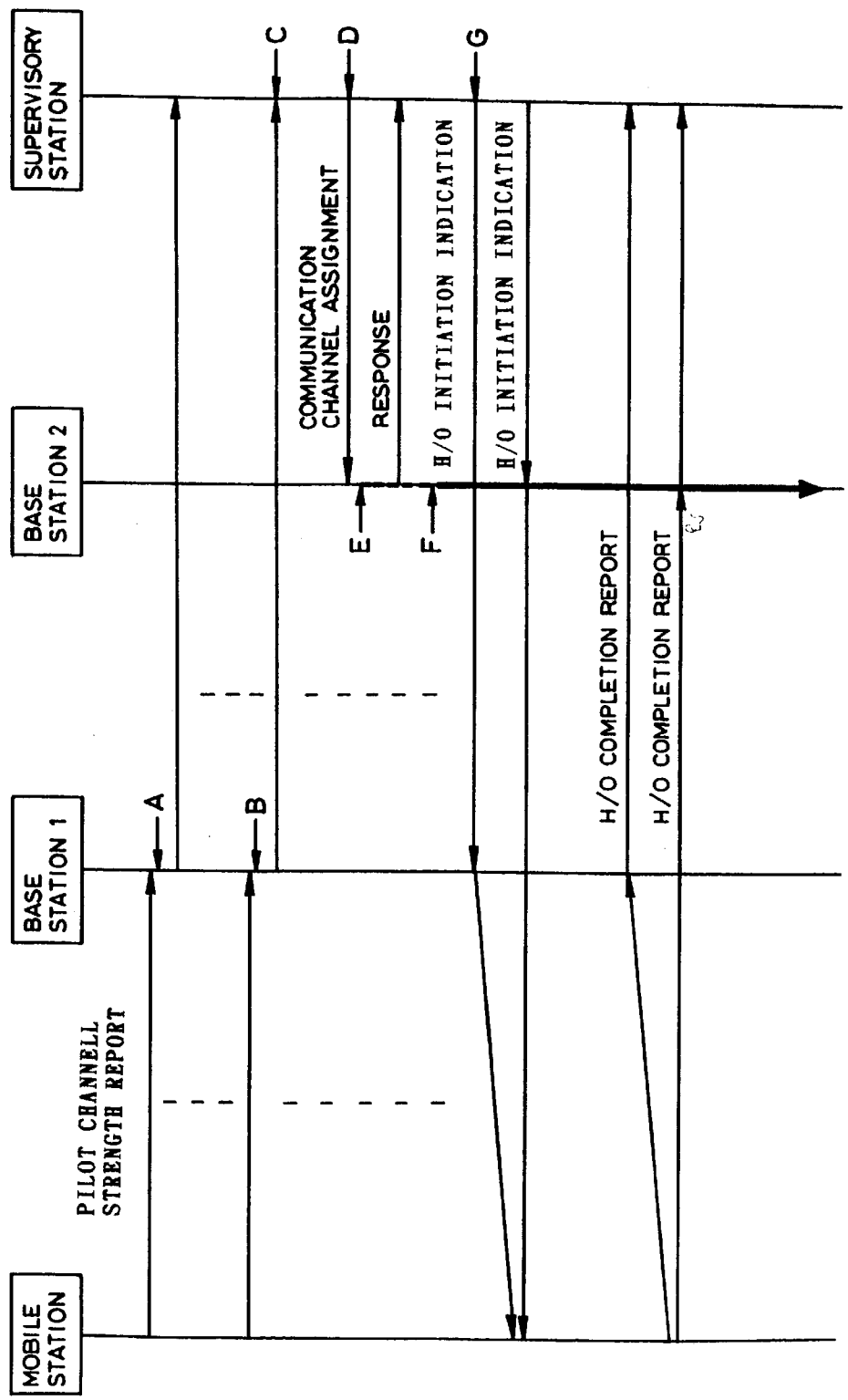
FIG. 5 is a sequence chart of processes between a mobile station, a base station and a supervisory station in the shown embodiment.

FIG. 5 is a sequence chart showing processes between the mobile station 3, the base stations 1 and 2 and the supervisory station.

The supervisory station HOST (not shown in FIG. 1) is installed at a location different from those of the base stations 1 and 2 and covers other base stations in addition to the base stations 1 and 2 and performs control therefor. The mobile station 3 regularly monitors the received pilot channel strength and its information (information of the base station from which the pilot signal arrives) to notify the result of monitoring to the base station.

Initially, only base station 1 is in communication with the mobile station 3. Therefore, notification of the received pilot channel strength from the mobile station is performed for the base station 1. Upon receipt of notification of the received pilot channel strength, the base station 1 makes judgment whether the received pilot channel strength from the base station other than own station is higher than or equal to a predetermined threshold value, namely of the level sufficient for handoff, on the basis of the content of the notice. If the recived pilot channel strength is less than the threshold value, the notice from the mobile station 3 is transmitted to the supervisory station as is ("A" in FIG. 5).

Here, when the received pilot channel strength of other base station (here, base station 2) is in excess of the threshold value, the base station 1 transmits the notice from the mobile station 3 to the supervisory station with adding a directivity control information of the up-link to the mobile station ("B" in FIG. 5).

The supervisory station recognizes that the mobile station 3 can handoff with the base station 2 by the notice from the base station 1 ("C" in FIG. 5) to transmit a command for channel assignment to the base station 2 for establishing communication with the mobile station 3. At the same time, the supervisory station, in turn, transmits installation position information of the base station 1 and the directivity control information of the up-link transmitted from the base station 1 to the base station 2 ("D" in FIG. 5). The base station 2 receiving the command for channel assignment, predicts orientation of the mobile station 3 from the own station on the basis of the installation position information of the base station1 from the supervisory station and the directivity control information of the up-link, to determine the initial directivity of the up-link ("E" in FIG. 5).

Figure 7:
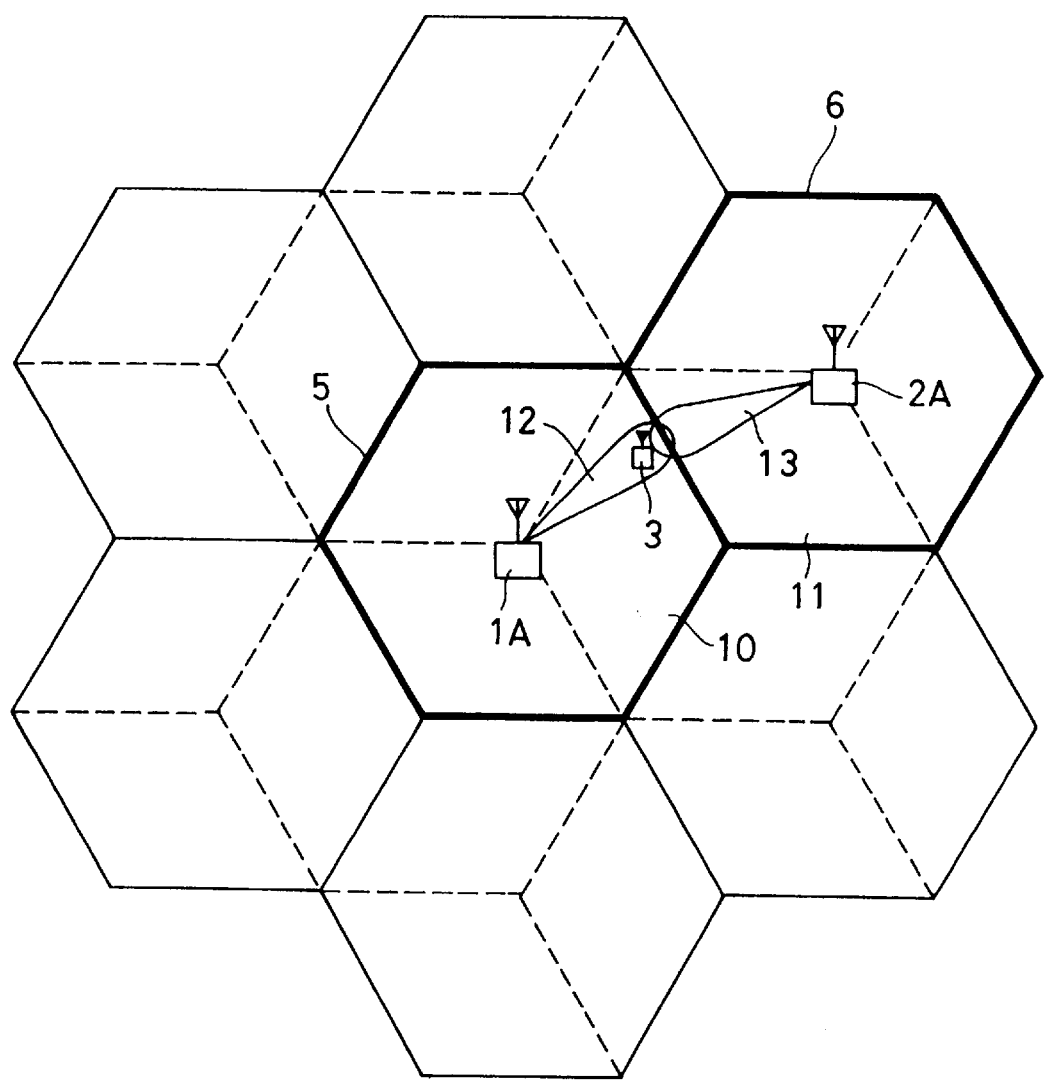
FIG. 7 is an illustration for explaining the second embodiment of an adaptive antenna directivity control method and a system therefore, in accordance with the present invention.

After completion of channel assignment, a response thereto is returned to the supervisory station. At this time, the directivities of respective up-links of the base stations 1 and 2 relative to the mobile station 3 are shown in FIG. 1. As set forth above, the beam pattern 7 in FIG. 7 is the directivity in the up-link controlled following to movement of the mobile station 3. The base station 1 and the mobile station 3 have certain communication period in time and thus can establish stable and sharp directivity.

On the other hand, the beam pattern 8 is the directivity determined by the base station 2 by predicting orientation of the mobile station 3 on the basis of information received from the base station 1 through the supervisory station. In FIG. 5, the base station 2 determining the initial directivity of the up-link from the directivity control information and the installation position information from the base station 1 is enabled to receive the transmission wave from the mobile station 3 at the same time of channel assignment to stabilize the directivity control gradually (broken line from "E" to "F" in FIG. 5). The supervisory station receiving the response of the channel assignment from the base station 2 recognizes completion of preparation for performing communication between the base station 2 and the mobile station 3 to issue a command for initiating handoff ("G" in FIG. 5).

The mobile station 3 received the command for initiating handoff starts to receive down-link of the base station 2, and transmits the response indicating that the mobile station has started to receive down-link of the base station 2 to the supervisory station by way of respective base station, and then completes the initiating handoff.

Next, discussion will be shown in the case where orientation (angle) of the mobile station 3 is predicted from the directivity control information and the installation position information of the base station 1 by the base station 2.

Figure 6:
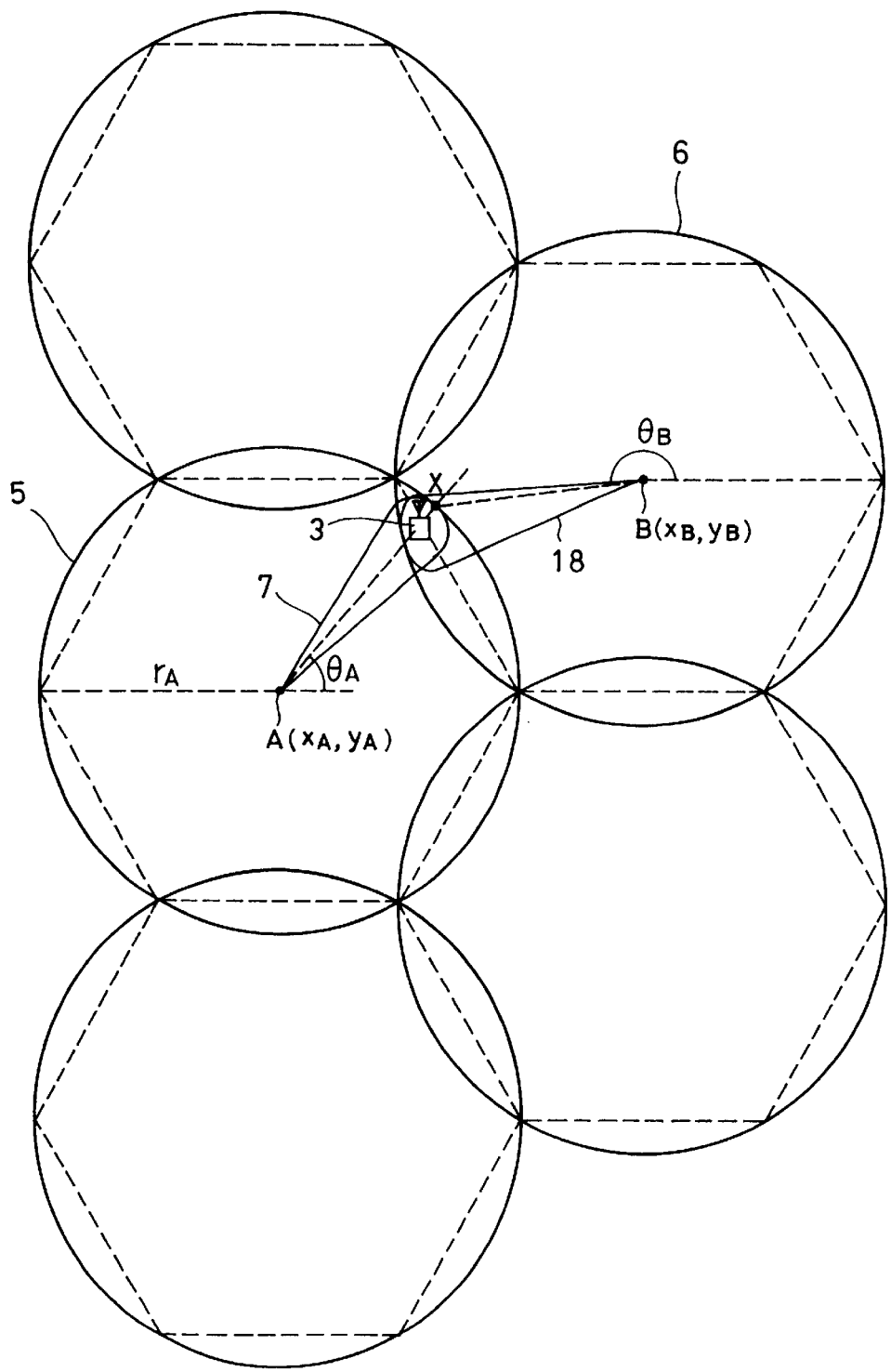
FIG. 6 is an enlarged illustration showing a part of FIG. 1 in the shown embodiment.

FIG. 6 is an enlarged illustration of a part of FIG. 1.

In FIG. 6, for convenience of arithmetic operation, a region of the cell area (service area) in respective base stations are shown by circle. Spaces where respective base stations are installed are taken as a plane on one coordinate axis to express the coordinate of respective installation position of the base stations. A point A in FIG. 6 represents installation position coordinates (XA, YA) of the base station 18 not shown) as the base station connected before handoff, and a point B represents installation position coordinates (XB, YB) of the base station as the base station to be connected by handoff.

In FIGS. 1 and 6, θA represents an angle directed toward the mobile station 3 in the installation coordinates (counterclockwise from the horizontal line) in the base station 1 derived from the directivity control information of the up-link for the mobile station 3 from the base station 1. rA represents a cell radius of the base station 1. θA and rA are for enabling the base station 2 to derive θB in FIG. 6 on the basis of the known information. θB represents the angle direction toward the mobile station 3 in counterclockwise direction from the horizontal line of the installation coordinates of the base station 2. This θB is the orientation (angle) of the mobile station 3 as viewed from the base station 2.

The base station 2 derives a coordinates of a point X in FIG. 6. The point X is an intersection of a straight line extending across the point A and the mobile station 3 and a boundary of the cell area 5 (one of the intersections closer to the mobile station). The base station 2 considers an equation of a circle extending through the point X as centered at the point B. Since a distance between the point B and the point X can be determined, the equation can be easily lead by deriving the circle with the radius thus derived. Then, finally, the coordinates of the point X is expressed by θ B and utilizing the fact that the point X is on the circle, θB can be derived.

Here, strictly, the point X is different from the position of the mobile station 3. Therefore, θB thus derived does not accurately consistent with the orientation of the mobile station 3 as viewed from the base station 2. However, a region where the cell areas of the base station 1 and the base station 2 overlap is quite narrow in comparison with the cell radius, normally, and since the beam pattern 18 of the up-link has a certain width, the error is in the extent substantially ignorable.

As set forth above, in the first embodiment, since the base station to be connected by handoff can preliminarily predict the orientation of the mobile station, it becomes possible to determine reception directivity of the up-link even of the transmission wave from the mobile station is not actually received to form an appropriately corresponded beam pattern.

In other words, it becomes possible to reduce interface from other mobile station to improve communication quality of the up-link of the base station to be connected by handoff upon initiation of handoff to increase channel capacity accordingly.

Furthermore, since the base station to be connected by handoff can preliminarily predict orientation of the mobile station, it becomes possible to establish the beam pattern appropriately corresponding to the initial directivity of the up-link in the orientation of the mobile station at the same time of channel assignment. By this, reception directivity control of the up-link of the base station to be connected by handoff can be restored quickly.

Next, discussion will be given for the second embodiment.

In the second embodiment, for the directivity control of the up-link from the mobile station in the first embodiment shown in FIGS. 1 to 6, the directivity control can be executed even in the down-link from the base station.

FIG. 7 is an illustration for discussing the second embodiment. In the same condition as FIG. 1 (upon initiation of handoff of the base station 1 and the base station 2), when the down-link and the directivity of the pilot channel are controlled individually (in the case where the pilot channel is common in all of the mobile station), FIG. 7 shows the condition of the directivity control in the down-link.

The area 10 in FIG. 7 is an area where the pilot channel of certain sector (sector where the mobile station 3 is positioned) of the base station 1A is effective. On the other hand, The area 11 is an area where the pilot channel of certain sector (sector where the mobile station 3 is positioned) of the base station 2A is effective. The beam pattern 12 represents the effective area of the down-link from the base station 1A to the mobile station 3. The beam pattern 13 represents the effective area of the down-link from the base station 2A to the mobile station 3. It should be noted that other construction is the same as that shown in FIG. 1.

Figure 8:
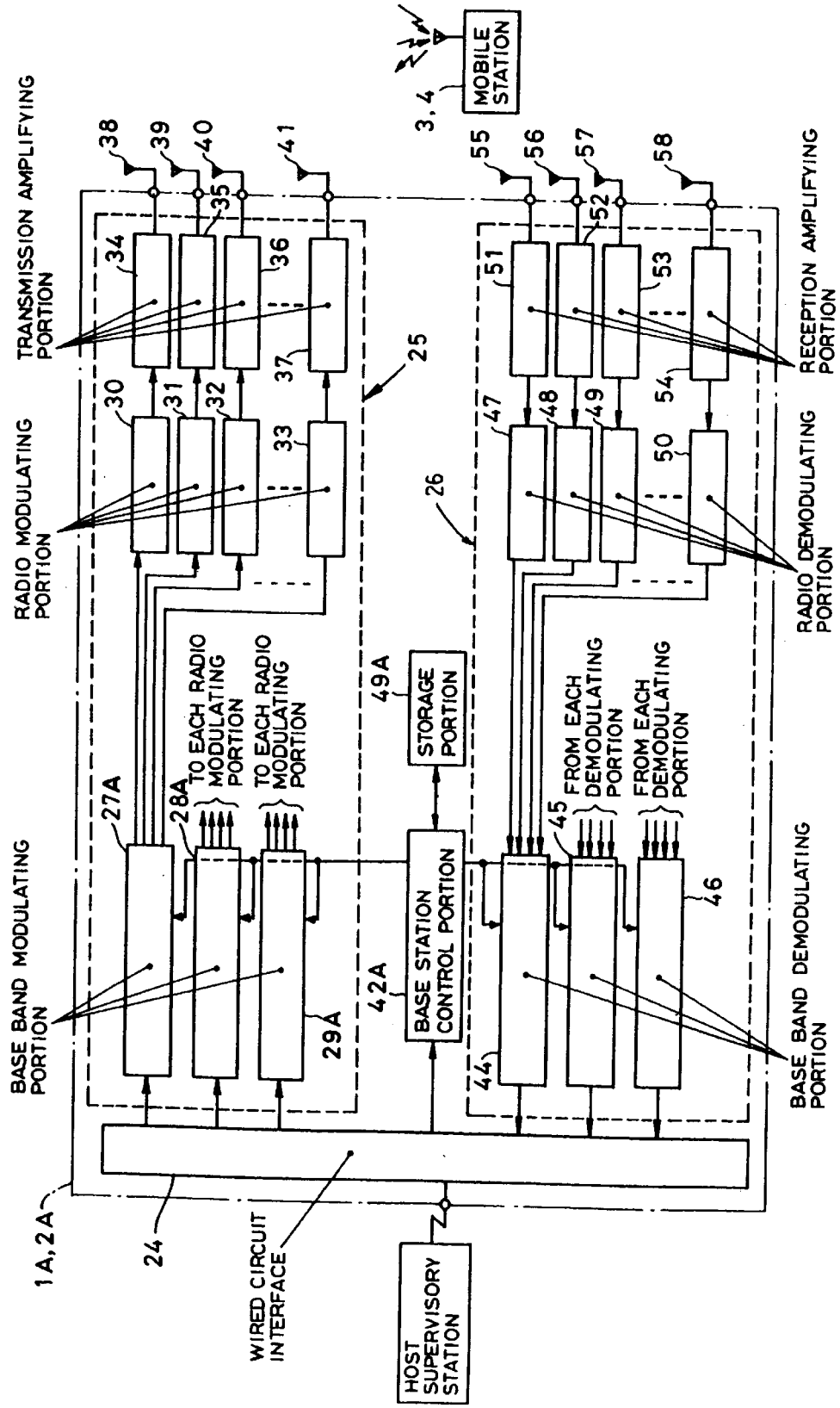
FIG. 8 is a block diagram showing the internal construction of abase station shown in FIG. 7.

FIG. 8 is a block diagram showing the internal construction of base station 1A and 2A.

The base stations 1A and 2A are the same as receiving portion 26 shown in FIG. 2 and are only different in the point where respective of base band modulating portions 27A, 28A and 29A of the transmitting portion 25A are controlled by the base station control portion 42A and the storage portion 49A.

Figure 9:
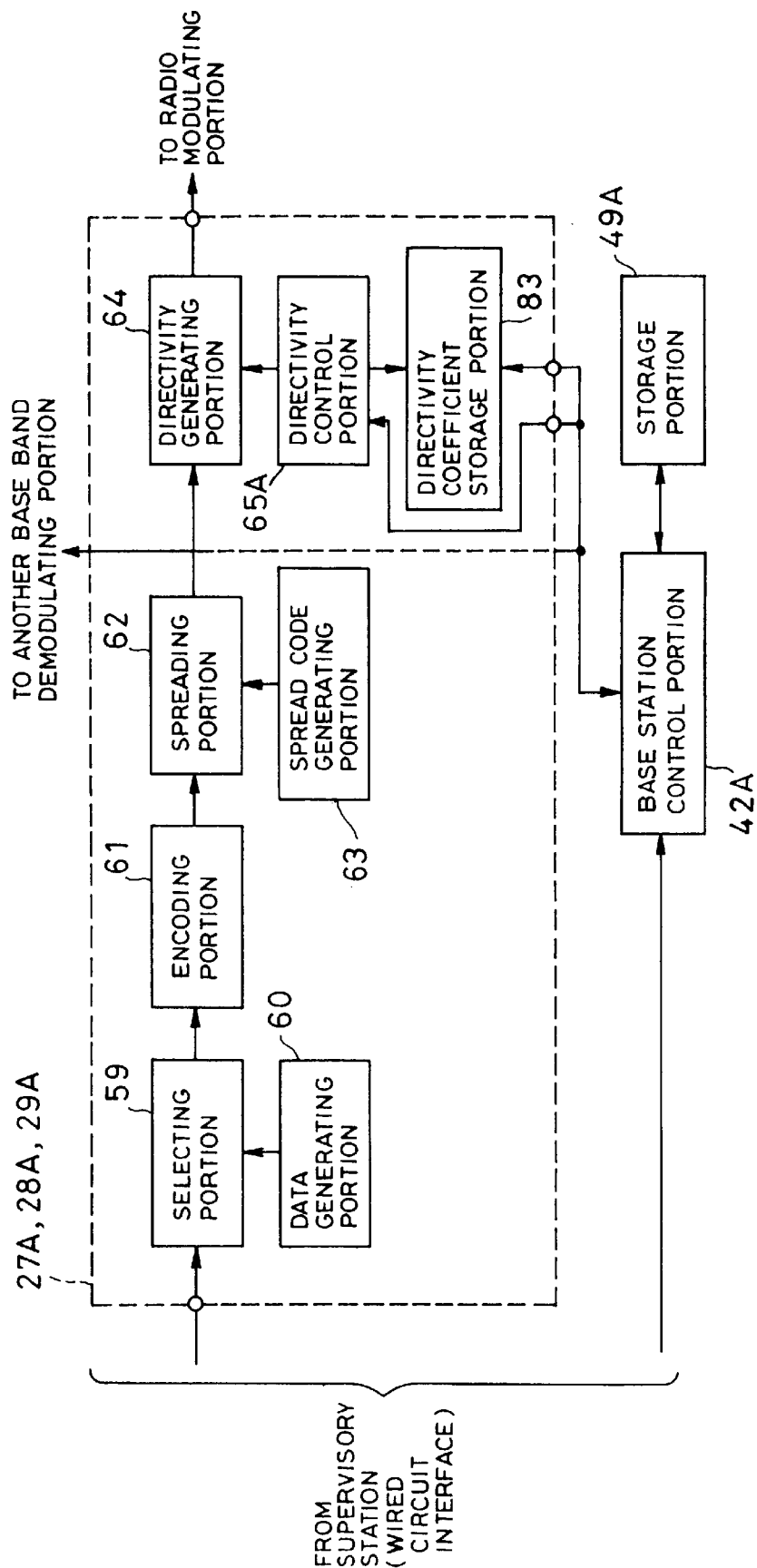
FIG. 9 is a block diagram showing an internal construction of a base band modulating portion in FIG. 8.

FIG. 9 is a block diagram showing the internal construction of each of the base band modulating portions 27A to 29A in FIG. 8.

The base band modulating portions 27A to 29A shown in FIG. 9 are newly provided with directivity coefficient storage portion 83 for the base band modulating portions 27 to 29 in the first embodiment shown in FIG. 3. Together with the directivity coefficient storage portion 83, the directivity control portion 65A is controlled by the base station control portion 42A and the storage portion 49A. It should be noted that other construction is the same as that shown in FIG. 3.

Next, discussion will be given for operation of the second embodiment.

In FIG. 7, the beam patterns 7 and 8 of the up-link in FIG. 1 are replaced with beam patterns 12 and 13 of down-link. On the other hand, the directivity control information of the up-link in FIG. 7 is replaced with the directivity control information of down-link. Furthermore, the beam of the up-link in FIG. 6 is replaced as the beam of the down-link.

It should be noted that, in FIG. 7, the areas 10 and 11 showing the effective areas of respective pilot channels of the base stations are fixed areas which are not control object.

Thus, in the second embodiment, the orientation of the mobile station can be predicted by the base station to be connected by handoff. Even when the transmission wave from the mobile station is not actually received for predicting the position of the mobile station, it becomes possible to preliminarily determine the transmission directivity of the down-link to form the beam pattern appropriately corresponding thereto. By this, the interference in the down-link in the area of the base station to be connected by handoff upon initiation of handoff, can be reduced.

Furthermore, since the base station to be connected by handoff, can preliminarily predict the orientation of the mobile station, the initial directivity in the down-link can be set in the orientation of the mobile station simultaneously with channel assignment. Namely, transmission directivity control of the down-link of the base station to be connected by handoff can be restored quickly.

Next, discussion will be given for the third embodiment.

While the pilot channel from the base station and the directivity of the down-link are controlled individually in the second embodiment shown in FIG. 7, it becomes possible to control directivities of the pilot channel and the down-link to the same directivities.

Figure 10:
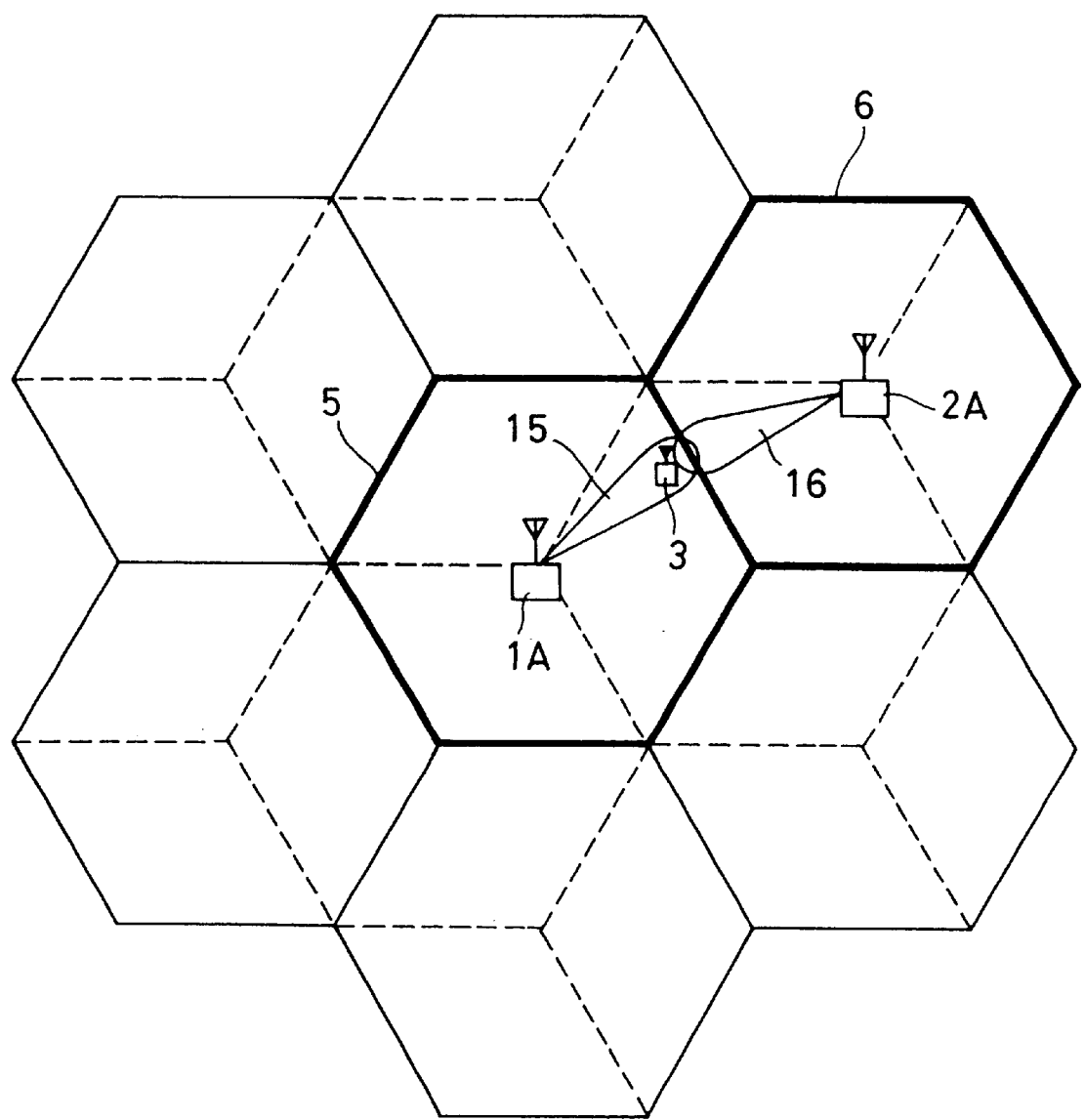
FIG. 10 is an illustration for explaining of directivity control of a down-link in the case where directivities of the down-link and a pilot channel are controlled to the same directivity in the shown embodiment.

FIG. 10 is an illustration showing a condition of directivity control of the down-link in the case where the directivities of the down-link and the pilot channel are controlled to the same directivity (when the mobile stations are respectively individual pilot channels) in the same condition as those of FIG. 7 (upon initiation of handoff in the base station 1 and the base station 2).

The beam pattern 15 in FIG. 10 represents effective area (directivity) of the pilot channel and the down-link from the base station 1A to the mobile station 3. The beam pattern 16 represents effective area of the pilot channel and the down-link from the base station 2A to the mobile station 3. It should be noted that other construction is the same as that shown in FIG. 3.

Next, discussion will be given for the fourth embodiment.

The fourth embodiment shown in FIG. 10 is the same as the embodiment shown in FIG. 7 except that the pilot channel and the down-link are controlled to the same directivity.

Next, discussion will be given for the fifth embodiment.

In FIG. 5 showing the first embodiment, judgment of the received pilot channel strength information notified from the mobile station is performed by the base station. In contrast to this, in the fifth embodiment, judgment for the received pilot channel strength information is performed by the supervisory station.

Figure 11:
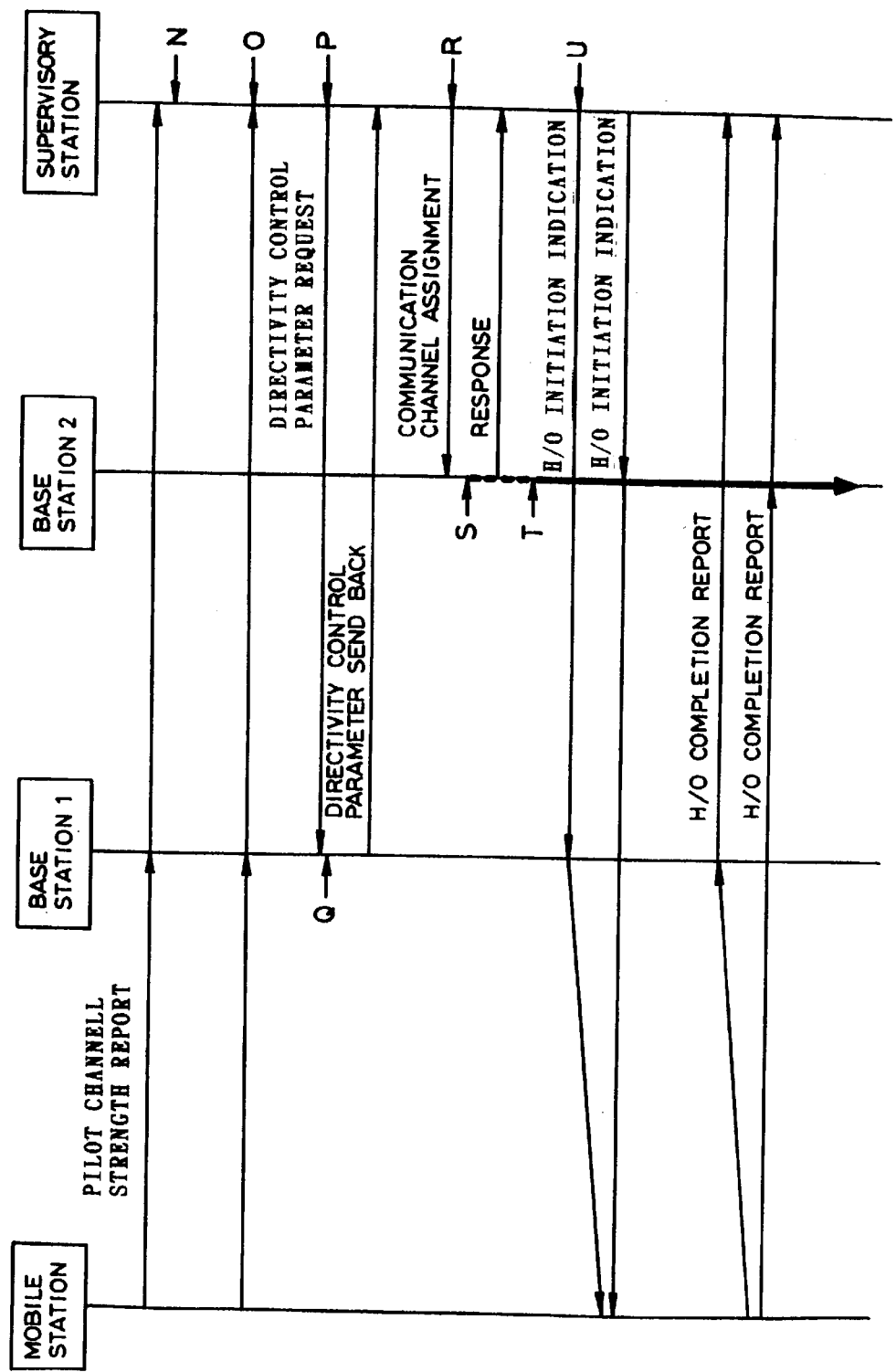
FIG. 11 is a sequence chart corresponding to the operation of the third embodiment.

FIG. 11 is a sequence chart corresponding to operation of the fifth embodiment.

The operation up to the timing where the mobile station 3 notifies the received pilot channel strength information to the base station 1 is the same as that shown in FIGS. 5 and 11. The base station 1 transmits the received pilot channel strength information received from the mobile station 3 to the supervisory station as is. The supervisory station checks if there is the pilot signal exceeding the threshold value among received information ("N" in FIG. 11). If there is the pilot exceeding the threshold value ("O" in FIG. 11), the supervisory station makes judgment that handoff of the mobile station with other base station (base station 2 in this case) can be performed to request notification of the directivity control information to the base station 1 in connection with the mobile station 3 ("P" in FIG. 11).

The base station 1 receiving the request transmits the directivity control information to the mobile station 3 to the supervisory station ("Q" in FIG. 11). The supervisory station receiving this notice transmits the command for channel assignment in order to establish communication between the base station 2 and the mobile station 3 ("R" in FIG. 11).

At the same time, the supervisory station transmits the installation position information of the base station 1 and directivity control information transmitted from the base station 1 to the base station 2. The base station 2 which receives command for channel assignment predicts orientation of the mobile station from the own station on the basis of the installation position information and directivity control information of the base station 1 transmitted from the supervisory station and the installation position information of the own station, to determine the initial directivity of one of the up-link, down link and the pilot channel ("S" in FIG. 11). Upon completion of channel assignment, response is returned to the supervisory station.

The base station 2 determined the initial directivity based on the directivity control information and the installation position information from the base station 1 is enabled to receive the transmission wave of the mobile station at the same time of channel assignment. Then, the directivity control is stabilized gradually (broken line from "S" to "T" in FIG. 11). The supervisory station receiving the response of channel assignment from the base station 2 recognizes that the base station 2 is prepared for communication with the mobile station 3 to command initiation of handoff to the mobile station 3 ("U" in FIG. 11). The base station 3 receiving this command initiates reception of the down-link from the base station 2 and transmits a response indicative of starting of reception to the supervisory station through respective base stations to complete initiation of handoff.

Thus, in the fifth embodiment, judgment of the received pilot channel strength notice from the mobile station is performed concentrically by the supervisory station instead of the base station. In general, the supervisory station has higher process performance than the base station, and there are many examples, in which judgment of the received pilot channel strength is performed by the supervisory station in the conventional handoff initiation sequence, the fifth embodiment can be implemented easily. As a result, arithmetic processing load upon initiation of handoff in the base station can be reduced.

Next, discussion will be given for the sixth embodiment.

Figure 12:
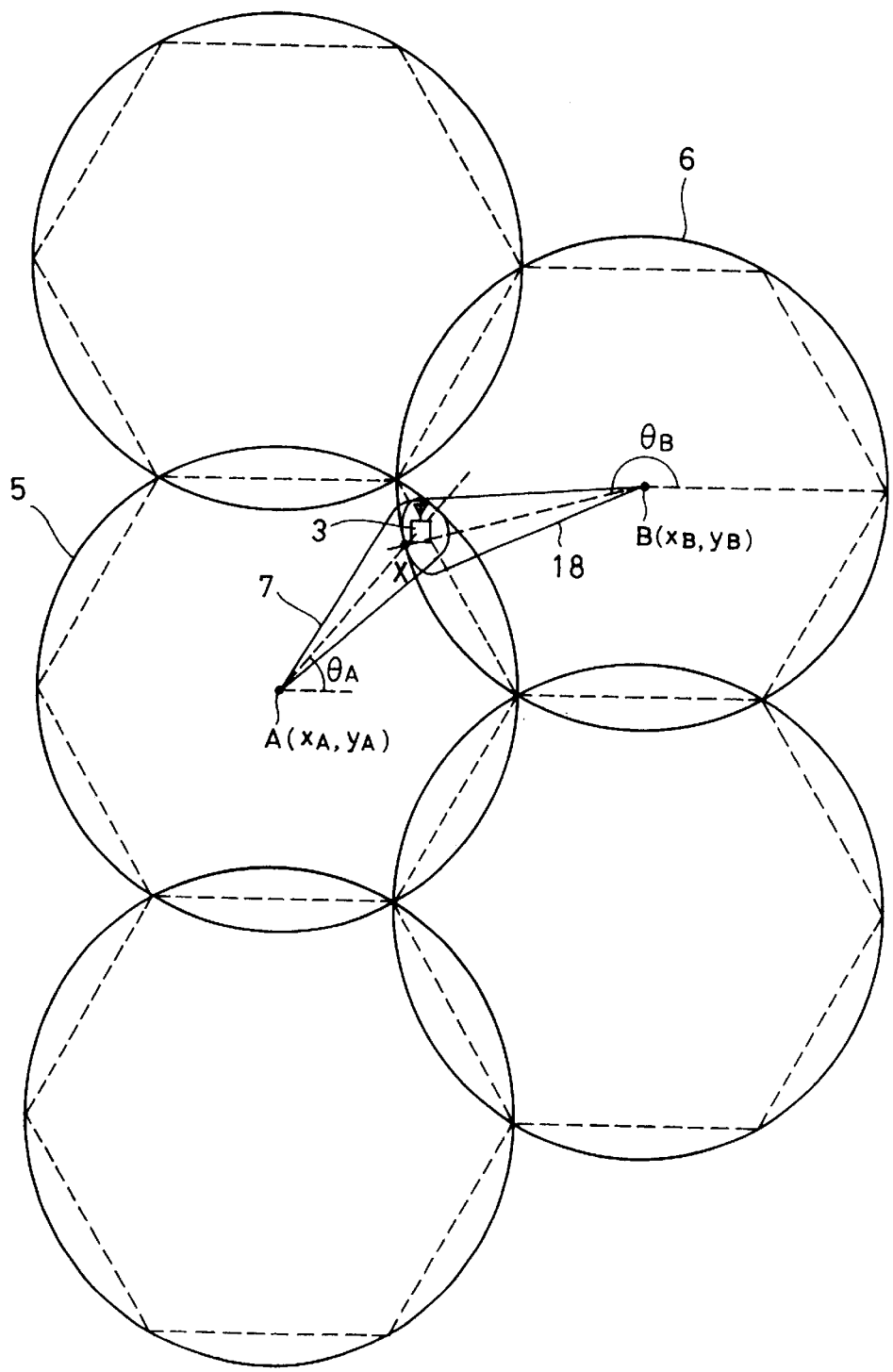
FIG. 12 is an illustration for discussing prediction of orientation of a mobile station in other base station from a installation position information of the base station and directivity control information in the shown embodiment.

FIG. 12 is an illustration for explaining prediction of orientation of the mobile station 3 to be performed by the base station 2 on the basis of the installation position information and the directivity control information of the base station 1.

At first, the base station 2 derives the coordinate of the point X in FIG. 12. The point X is an intersection between the straight line extending across the point A and the mobile station 3 and the boundary of the cell area 6 (the intersections closer to the mobile station). The point X is located on the circle centered at the point B and having a radius of rB and can be expressed by a polar coordinates. Thus, θB can be derived.

Here, similarly to the case of FIG. 6, the point X is strictly different from the position of the mobile station 3. Therefore, θB thus derived does not precisely match with the orientation of the mobile station 3 as viewed from the base station 2. However, for the reason similar to that discussed with respect to FIG. 6, the error is in the extent to be ignored. It should be noted that the manner for deriving θB shown in FIGS. 6 and 12 are mere examples therefor, in which approximated value of θB is derived from θA and coordinates of the points A and b in principle to reduce arithmetic processing load upon establishing the initial directivity.

Next, modification of the embodiments will be discussed.

Figure 13:
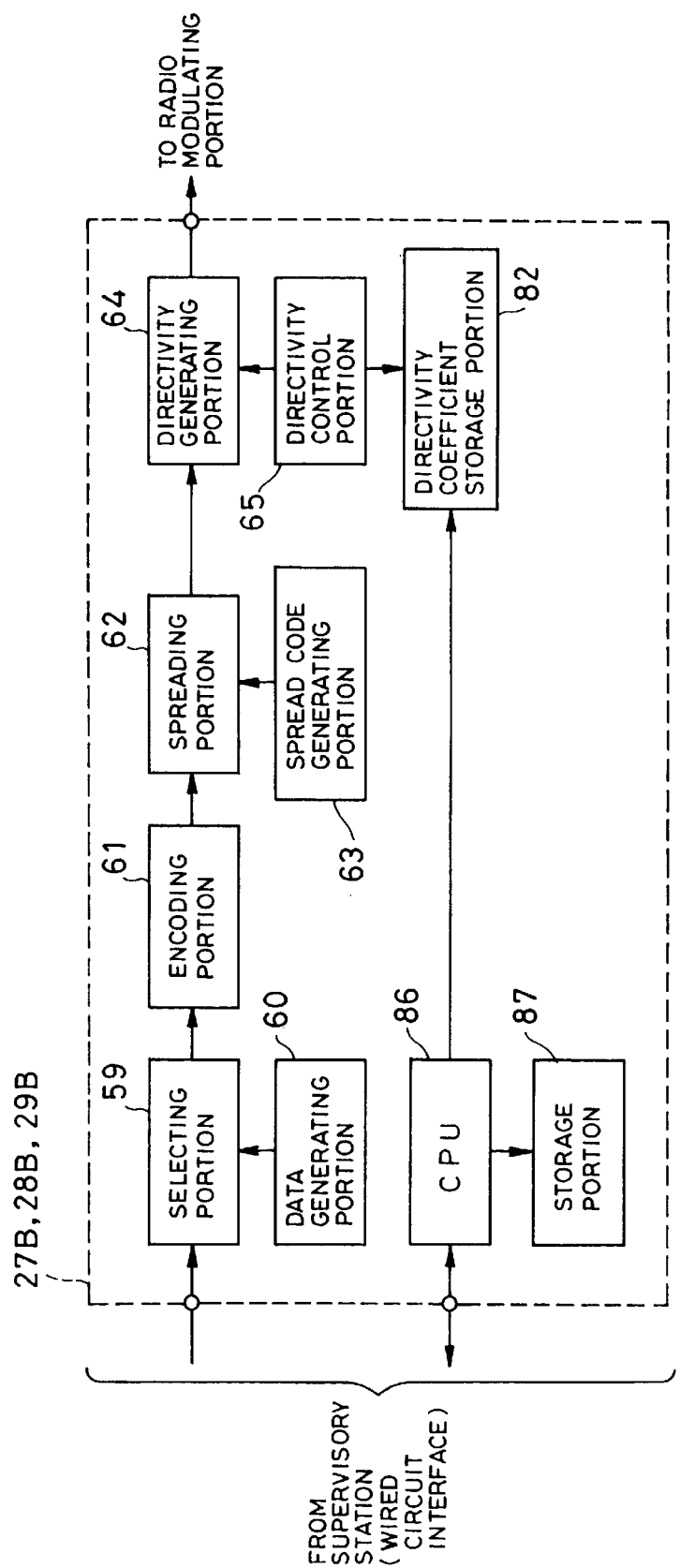
FIG. 13 is a block diagram showing a modification of the base band modulating portion in the transmitting portion in the shown embodiment.

FIG. 13 is a block diagram showing a modification of the base band modulating portions 27A to 29A shown in FIG. 9.

Each of the base band modulating portions 27B to 29B in this modification is provided with a directivity coefficient storage portion 82, CPU 86 connected to the supervisory station HOST via the wired circuit interface portion 24, and the storage portion 87. Other construction is the same as the base band modulating portions 27A to 29A shown in FIG. 9. CPU 86 and the storage portion 87 executes operation corresponding to the base station control portion 42A and the storage portion 49A shown in FIG. 8. Other operation is similar to those of the base band modulating portions 27A to 29A shown in FIG. 9.

When this modification of the base band modulating portions 27B to 29B are applied to the transmitting portion 25A in FIG. 8, it becomes unnecessary to provide the base station control portion 42A and the storage portion 49A.

Figure 14:
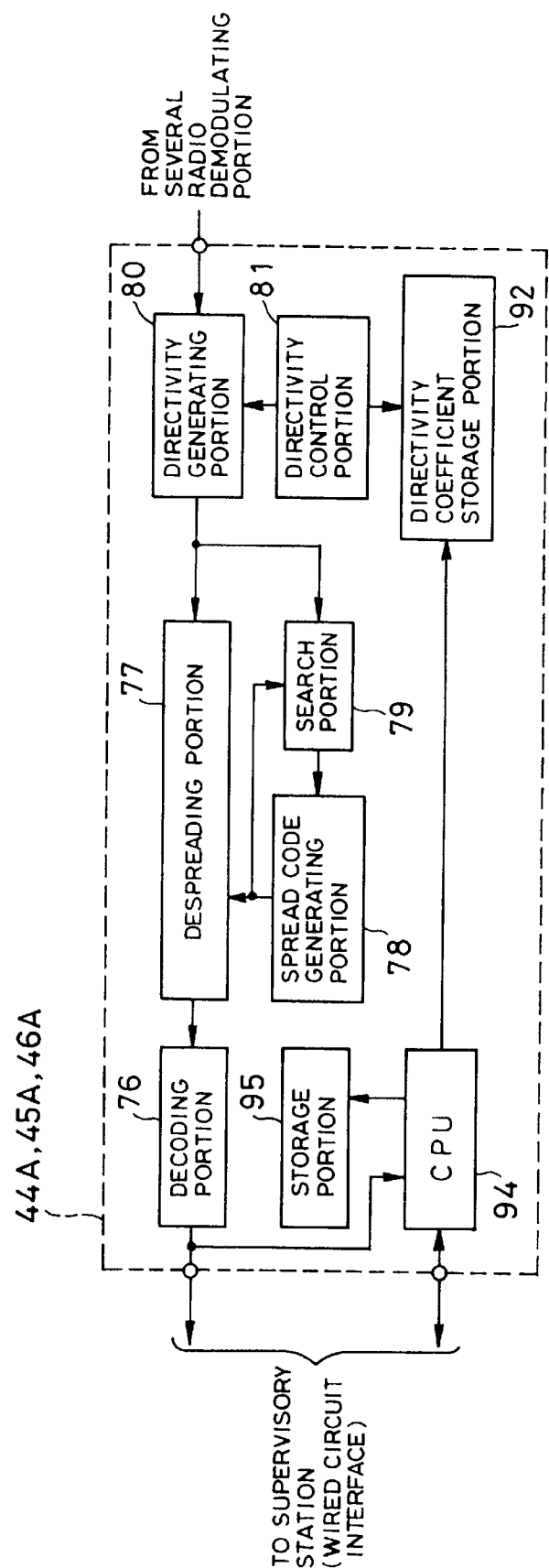
FIG. 14 is a block diagram showing a modification of the base band demodulating portion in the receiving portion in the shown embodiment.
Figure 15:
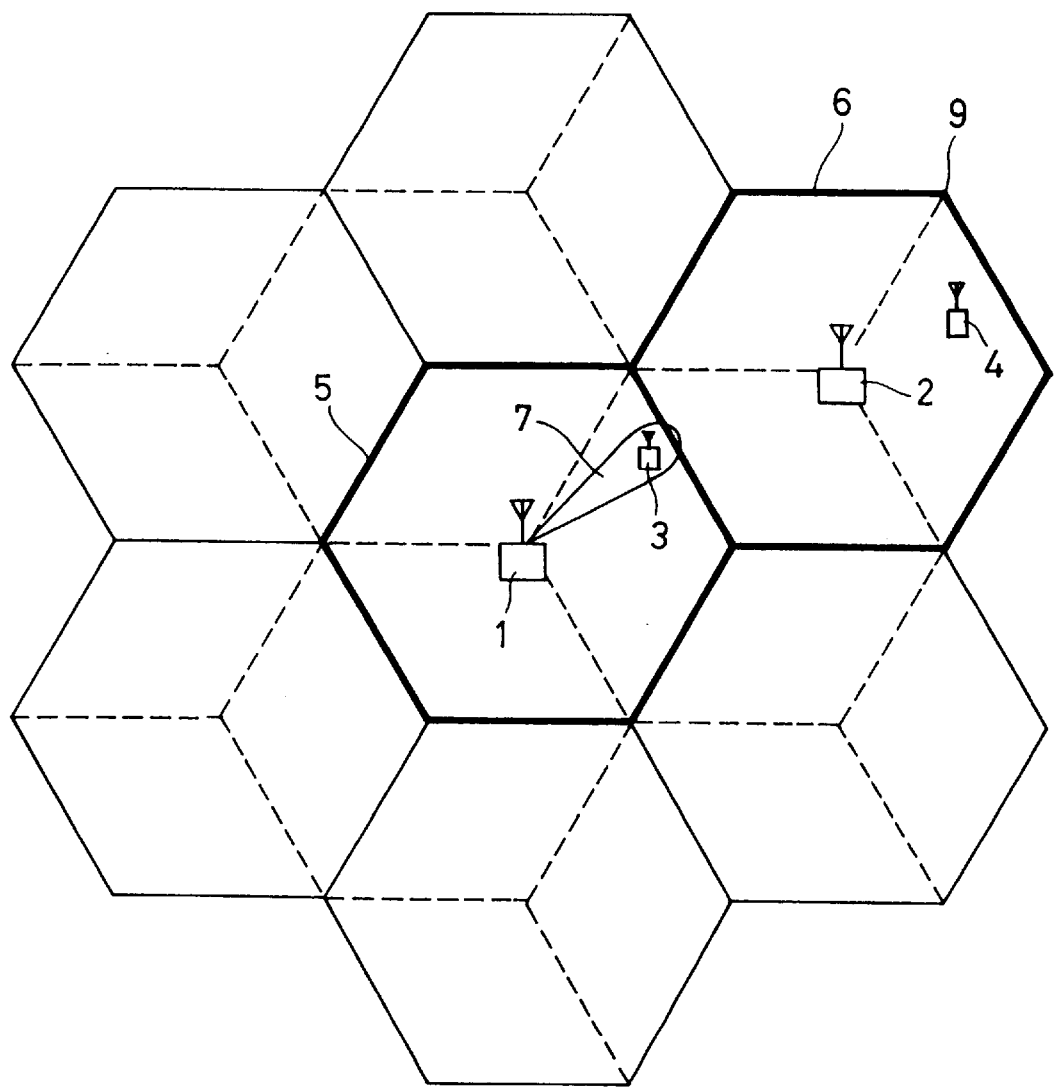
FIG. 15 is an illustration for explaining an initial directivity control of the up-link in the base station to be connected by handoff with respect to the mobile station, in the prior art.
Figure 16:
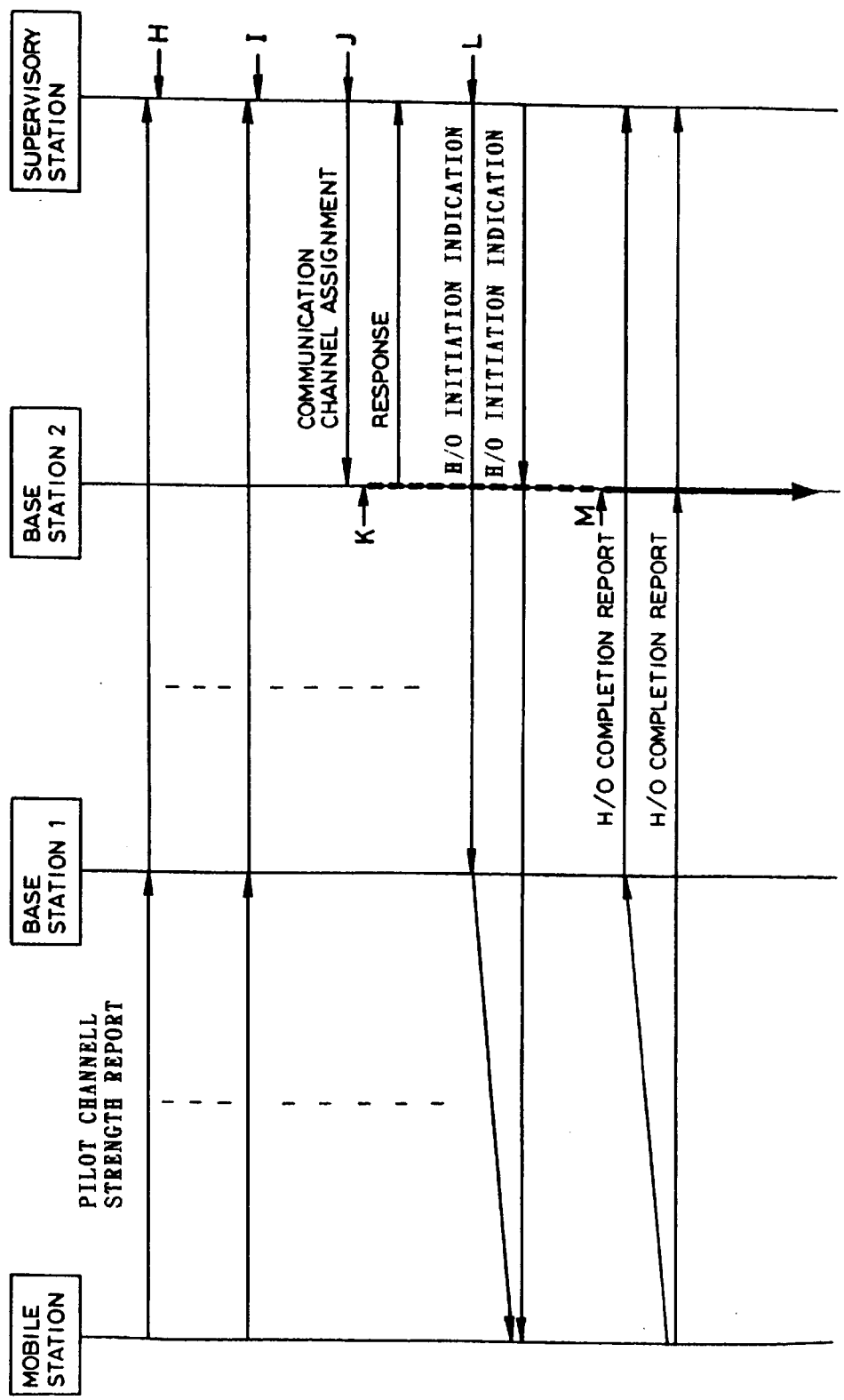
FIG. 16 is a sequence chart between the supervisory station, the base station and the mobile station in the prior art.
Figure 17:
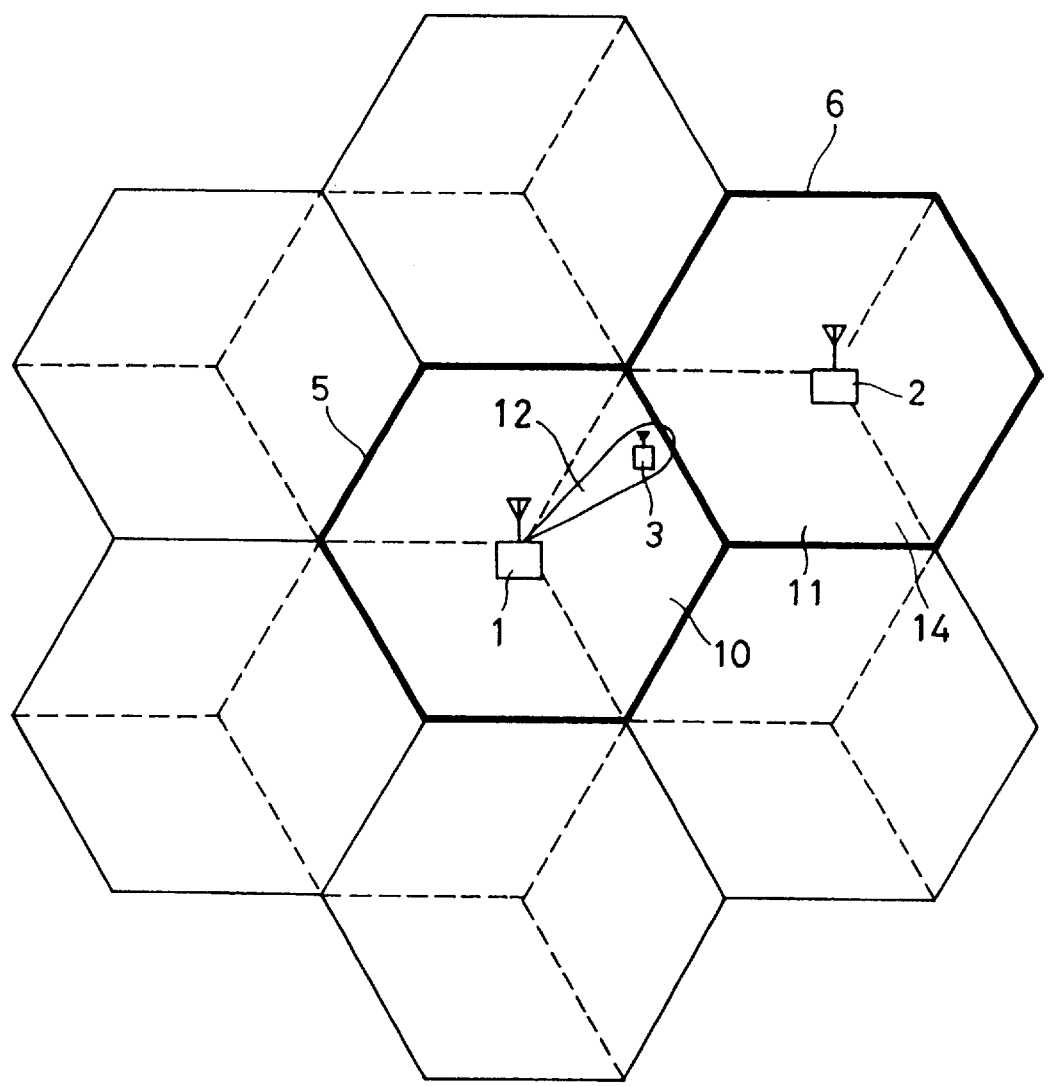
FIG. 17 is an illustration for explaining the initial directivity control of the down-link in the base station to be connected by handoff with respect to the mobile station, in the prior art.
Figure 18:
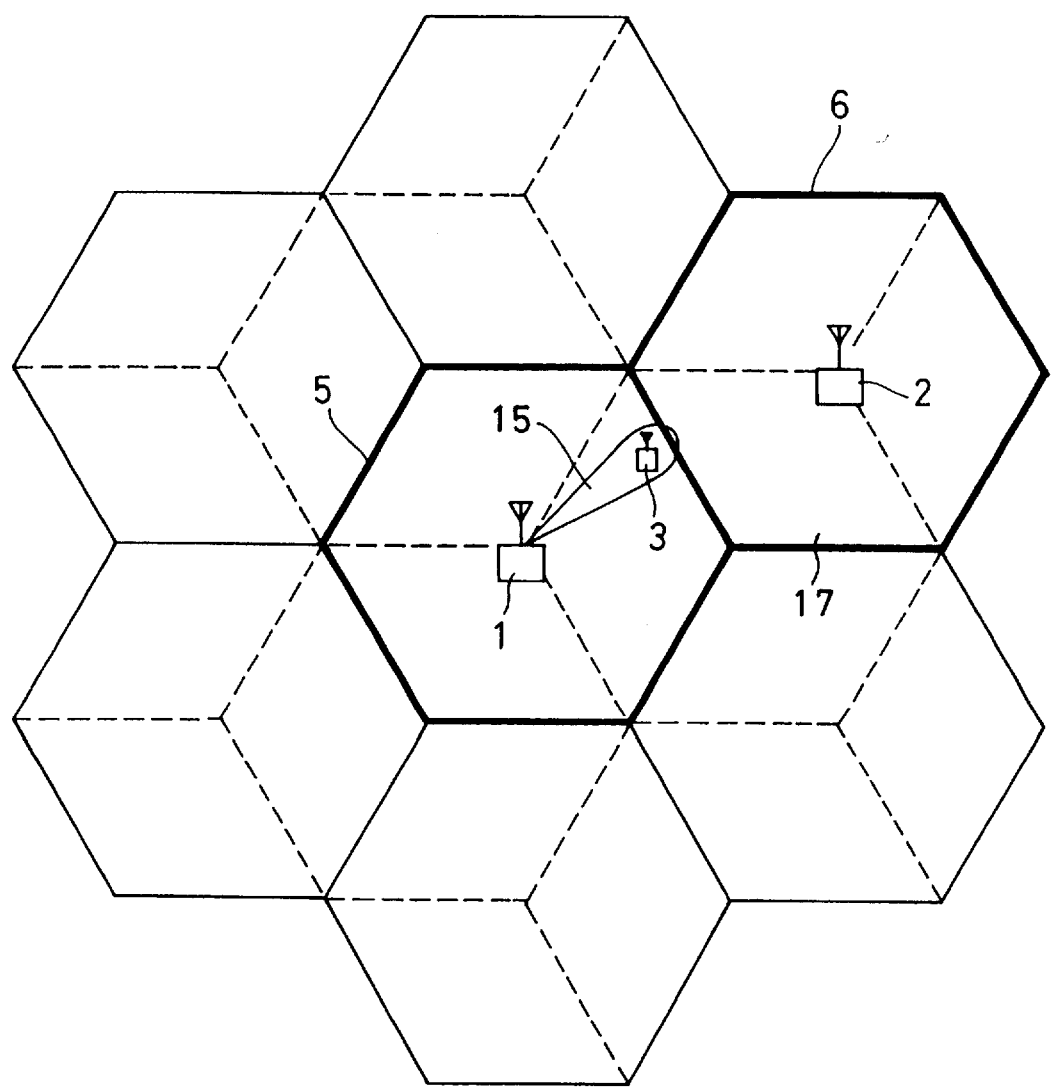
FIG. 18 is an illustration for explaining the initial directivity control of the down-link in the base station to be connected by handoff with respect to the mobile station, in the prior art.

FIG. 14 is a block diagram showing a modification for the base band demodulating portions 44 to 46 (FIG. 4) in the receiving portion 26 of FIG. 2 (FIG. 8).

Each of the base band modulating portions 44A, 45A and 46A of the modification is constructed with an internal directivity coefficient storage portion 92, CPU 94 connected to the supervisory station HOST through the wired circuit interface portion 24 and receives the decoded data from the decoding portion 76, and a storage portion 85. Other construction is similar to the base band demodulating portion 44 to 46 shown in FIG. 4. CPU 84 and the storage portion 95 are perform operation corresponding to the base station control portion 42 and the storage portion 49 (base station control portion 42A and the storage portion 49A) shown in FIG. 2 (FIG. 8). Other operation is similar to those of the base band demodulating portions 44 to 46 shown in FIG. 4.

When the base band demodulating portions 44 to 46 of the shown modification are applied to the receiving portion 26 of FIG. 2 (FIG. 8), the base station control portion 42 and the storage portion 49 (base station control portion 42A and the storage portion 49A) are not necessary to provide.

It should be noted that while the shown embodiment has been discussed with respect to only directivity control in the base station, it is applicable for the mobile station, such as mobile communication unit portable by loading on the vehicle, as is. Directivity control on the side of the mobile station should be included in the present invention.

As can be clear from the discussed given hereabove, with the adaptive antenna directivity control method and the system therefor according to the present invention, the mobile station in communication with certain base station initiates soft handoff to simultaneously communicate with other base station to permit prediction of orientation of the mobile station from the base station to be connected by handoff on the basis of the installation position information from respective base stations and directivity control information of the base station connected before handoff, for determining the initial directivity control parameter to preliminarily establish the initial directivity.

As a result, interference in the up-link and/or the down-link upon initiation of handoff can be reduced to improve communication quality of the up-link of the base station to be connected by handoff, upon initiation of hand off. Also, directivity control can be quickly restored to result in increasing of channel capacity.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. An adaptive antenna directivity control method where a mobile station and base station to be connected with said mobile station in radio through an up-link and a down-link being governed by a supervisory station, respective transmission signal or reception signal of a plurality of antenna elements of said base station being varied in amplitude and phase for combining in a particular orientation for establishing a directivity by a radiation pattern by combining, comprising:

step of initiating soft handoff in said mobile station;

step of obtaining an installation position information from a first base station which is connected before handoff and directivity information of an up-link of said first base station relative to said mobile station;

step of predicting an orientation of said mobile station from own station by a second base station to be connected by handoff on the basis of the directivity information of the up-link; and step of determining an initial directivity control parameter of the up-link corresponding to obtained orientation of said mobile station.

2. An adaptive antenna directivity control method as set forth in claim 1, wherein the directivity of the up-link to be initially set by said second base station is controlled by determining a directivity control parameter so that said directivity of the up-link is narrower than a normal cell or sector area.

3. An adaptive antenna directivity control method as set forth in claim 1, wherein a directivity information of a down-link of said first base station is used in place of the directivity information of the up-link of said first base station for predicting orientation of the mobile station by said second base station for determining initial directivity control parameter for the down-link.

4. An adaptive antenna directivity control method as set forth in claim 3, wherein said second base station determines directivity control parameter of individual pilot channel for the mobile station together with the initial directivity control parameter of the down-link.

5. An adaptive antenna directivity control method as set forth in claim 3, wherein the directivity control parameter is determined so that the directivity of the down-link is narrower than normal sector area.

6. An adaptive antenna directivity control method as set forth in claim 1, wherein the initial directivity control parameter is determined in said first base station upon initiation of soft handoff in said mobile station, by notifying the installation position information of said first base station and the directivity control parameter to said second base station through said supervisory station.

7. An adaptive antenna directivity control method as set forth in claim 1, wherein a position information of said mobile station relative to said first base station is notified to said second base station via said supervisory station in place of said installation position information of said first base station for determining said initial directivity control parameter in said second base station.

8. An adaptive antenna directivity control method as set forth in claim 1, wherein the installation position information of said first base station is preliminarily notified to peripheral base stations from said supervisory station in replace of notifying to said second base station.

9. An adaptive antenna directivity control method as set forth in claim 1, wherein the orientation of said mobile station is approximately derived in said second base station.

10. An adaptive antenna directivity control system where a mobile station and base station to be connected with said mobile station in radio through an up-link and a down-link being governed by a supervisory station, respective transmission signal or reception signal of a plurality of antenna elements of said base station being varied in amplitude and phase for combining in a particular orientation for establishing a directivity by a radiation pattern by combining, comprising:

said mobile station including means for initiating soft handoff;

a second base station to be connected by handoff including means for predicting an orientation of said mobile station from own station on the basis of installation position information from a first base station connected before handoff and a directivity information of the up-link of said first base station, and determining an initial directivity control parameter of the up-link and/or a down-link.

11. An adaptive antenna directivity control system as set forth in claim 10, wherein said base station comprises a wired circuit interface portion at least processing interface with a supervisory station, a radio receiving portion, a radio transmitting portion and a base station control and storage portion, and a directivity control parameter in the down-link in said radio receiving portion and/or the down-link in the radio transmitting portion is determined by control process of said base station control and storage portion.

12. An adaptive antenna directivity control system as set forth in claim 11, wherein said base station control and storage portion is provided in or out of at least one of said radio receiving portion and said radio transmitting portion, respectively.

13. An adaptive antenna directivity control system, comprising:

a mobile station;

a base station connected via radio frequency signals with said mobile station, said base station being governed by a supervisory station;

a plurality of antenna elements of said base station, the antenna elements combined in a particular orientation to establish a directivity by a radiation pattern varied in amplitude and phase;

a second base station after soft-handoff connected via radio frequency signals to said mobile station, said second base station configured to predict an orientation of said mobile station with respect to said second station based on directivity information obtained by said first base station.

14. The system of claim 13, wherein said second base station is configured to set initially a directivity of an up-link in the mobile station, which directivity is more narrow than a normal cell or sector area.

* * * * *